(12) United States Patent
Rao et al.

(10) Patent No.: US 11,196,470 B2
(45) Date of Patent: Dec. 7, 2021

(54) ENHANCING THROUGHPUT USING AGILE BEAM SWITCHING AND USER SCHEDULING IN CELLULAR SYSTEMS

(71) Applicant: Blue Danube Systems, Inc., New Providence, NJ (US)

(72) Inventors: Raghunandan M. Rao, Blacksburg, VA (US); Dilip Bethanabhotla, Fremont, CA (US); Ramesh Chembil-Palat, Millbrae, CA (US)

(73) Assignee: Blue Danube Systems, Inc., New Providence, NJ (US)

( * ) Notice: Subject to any disclaimer, the term of this patent is extended or adjusted under 35 U.S.C. 154(b) by 54 days.

(21) Appl. No.: 16/600,428

(22) Filed: Oct. 11, 2019

(65) Prior Publication Data
US 2020/0119790 A1   Apr. 16, 2020

Related U.S. Application Data

(60) Provisional application No. 62/745,705, filed on Oct. 15, 2018.

(51) Int. Cl.
*H04B 7/06* (2006.01)
*H04B 7/0413* (2017.01)
(Continued)

(52) U.S. Cl.
CPC ......... *H04B 7/0617* (2013.01); *H04B 7/0413* (2013.01); *H04B 7/0626* (2013.01);
(Continued)

(58) Field of Classification Search
CPC ...... H04B 7/024; H04B 7/088; H04B 7/0617; H04B 7/0619; H04B 7/0413; H04B 7/0626; H04B 7/0632; H04B 7/0695; H04B 7/0469; H04L 5/005; H04W 16/28; H04W 56/001; H04W 72/046; H04W 72/048; H04W 72/12
See application file for complete search history.

(56) References Cited

U.S. PATENT DOCUMENTS 8,396,035 B2   3/2013   van Rensburg et al.
2001/0034236 A1   10/2001   Tong et al.
(Continued)

FOREIGN PATENT DOCUMENTS

WO   2015/115776   8/2015

*Primary Examiner* — Quoc Thai N Vu
(74) *Attorney, Agent, or Firm* — Occhiuti & Rohlicek LLP

(57) ABSTRACT

A method of communicating with UEs located within a serviced area, the method involving: defining a set of differently directed, narrow beams which collectively cover the serviced area; (a) during a first period of operation: (i) cycling through the beams one at a time by separately activating each beam in synchronization with the subframe structure of a signal from the BBU; and (ii) while each beam is activated, initiating channel sounding for all of the UEs in the serviced area; and (b) during a second period of operation immediately following the first period of operation: (i) cycling through all of the beams one at a time by separately activating each beam in synchronization with the subframe structure of the signal from the BBU; and (ii) while each beam is activated, transmitting data over that beam to the UEs in accordance with a scheduling scheme.

33 Claims, 16 Drawing Sheets

(51) Int. Cl.
*H04L 5/00* (2006.01)
*H04W 56/00* (2009.01)
*H04W 72/04* (2009.01)
*H04W 72/12* (2009.01)
*H04B 7/0456* (2017.01)

(52) U.S. Cl.
CPC .......... *H04L 5/005* (2013.01); *H04W 56/001* (2013.01); *H04W 72/046* (2013.01); *H04W 72/048* (2013.01); *H04W 72/12* (2013.01); *H04B 7/0469* (2013.01)

(56) References Cited

U.S. PATENT DOCUMENTS

| | | | | |
|---|---|---|---|---|
| 2017/0156142 A1* | 6/2017 | Sato | .................... | H04L 27/2601 |
| 2018/0070343 A1* | 3/2018 | Chen | ................. | H04W 56/0015 |
| 2018/0367273 A1* | 12/2018 | Park | ................... | H04W 72/046 |
| 2019/0312629 A1* | 10/2019 | Tang | ................... | H04B 7/0695 |
| 2020/0288451 A1* | 9/2020 | Lee | .................... | H04W 72/046 |

* cited by examiner

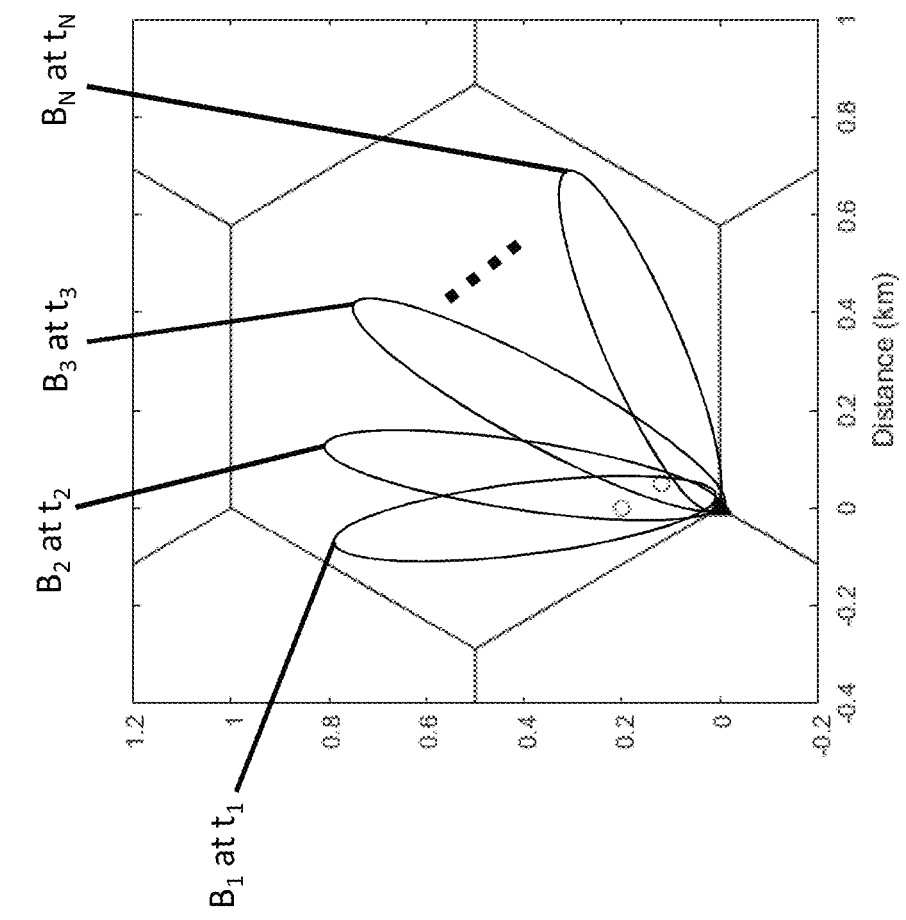
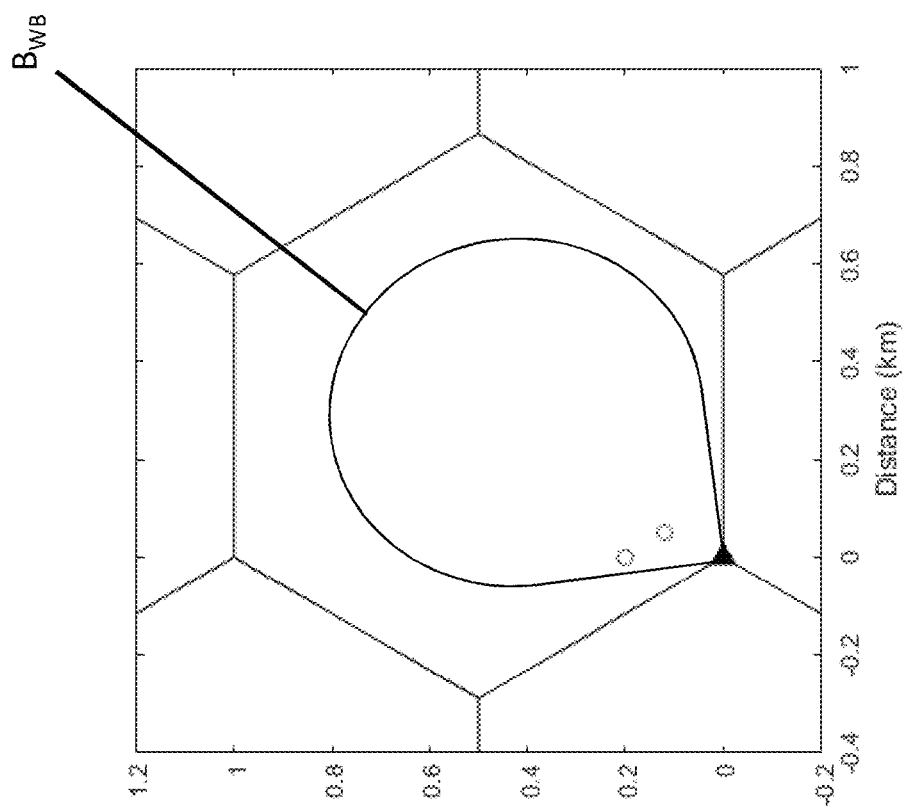

ENHANCING THROUGHPUT USING AGILE BEAM SWITCHING AND USER SCHEDULING IN CELLULAR SYSTEMS

CROSS-REFERENCE TO RELATED APPLICATIONS

This application claims the benefit under 35 U.S.C. 119(e) of Provisional Application Ser. No. 62/745,705, filed Oct. 15, 2018, entitled "Enhancing Throughput Using Agile Beam Switching and User Scheduling in Cellular Systems," the entire contents of which are incorporated herein by reference.

TECHNICAL FIELD

Embodiments of the invention generally relate to enhancing throughput in cellular systems and, more specifically, to enhancing throughput in cellular systems that employ agile beam switching.

BACKGROUND

3GPP LTE Release 13 and beyond have standardized new multi-antenna technologies such as Full-dimension MIMO (also known as elevation/3D beamforming), where narrow beams are used to improve SINR at different elevation regions in the cell. Such systems use a large rectangular active antenna array which can steer beams in both azimuth and elevation directions through flexible software control. However, today's dominant cellular deployments are 3GPP Release 8 systems supporting 2×2 MIMO and 4×4 MIMO, which is a far cry from 5G New Radio (5G NR), which supports more than 64 antennas at the base station.

When active antenna panels capable of 3D beamforming get deployed in the future, it is in the best interest of network operators to ensure that legacy LTE UEs also reap the benefits of such technology. However, providing throughput enhancements in LTE using active antenna systems is non-trivial from a protocol perspective. This is due to the incompatibility of legacy LTE's channel state information (CSI) feedback mechanism with 3D beamforming arrays. The feedback mechanisms introduced in earlier releases of LTE did not take 3D beamforming into account while advanced mechanisms such as elevation codebooks, non-precoded and beamformed CSI-RS reference signals suited for 3D beamforming were standardized only recently in LTE Release 13/14 and 5G-NR.

Various people have studied approaches to enhancing throughput in LTE systems. For example, some authors have demonstrated throughput enhancements enabled by FD-MIMO through simulations for LTE-A (Refs. 1, 2). Others have proposed sectorization in the azimuth and elevation directions to demonstrate throughput improvements in bursty as well as full-buffer traffic for LTE/LTE-A (see Ref. 3). Still others have proposed a codebook-based feedback scheme for FDD massive MU-MIMO and suggests modifications to the LTE/LTE-A codebook to leverage elevation beamforming to enhance LTE-A throughput (see Ref 4). And others have presented the architecture of a Full-dimension MIMO prototype and demonstrated huge throughput improvements in field trials (see Ref. 5). However, a salient feature of all of these works is that they involve significant changes to the LTE standard and hence are not deployable in commercial LTE systems.

SUMMARY

Described herein is an agile beamforming scheme that is capable of providing significant throughput improvements compared to conventional LTE systems. Massive MIMO active antenna panels with beamforming capabilities employ an agile beam switching and user scheduling scheme to ensure users across the sector are served data during periods of high SINR. This can result in a significant increase in average and cell-edge throughput in both cases of BBU-RU coordination or the lack thereof. Moreover, the approaches described herein generally do not require significant changes to the LTE standard.

In general, in at least one aspect, the invention features a method of communicating with a plurality of devices (UEs) that are located within a serviced area. The method involves: defining a set of differently directed, narrow beams which collectively cover the serviced area, wherein each beam covers a different subset of the plurality of UEs within the serviced area; receiving a signal from a baseband unit (BBU), and establishing a first period of operation and a second period of operation. During the first period of operation: (i) cycling through all of the beams of the set of differently directed beams one at a time by separately activating each beam in synchronization with the subframe structure of the signal from the BBU; and (ii) while each beam is activated, initiating channel sounding for all of the UEs among the plurality of UEs in the serviced area. During the second period of operation immediately following the first period of operation: (i) cycling through all of the beams of the set of differently directed beams one at a time by separately activating each beam in synchronization with the subframe structure of the signal from the BBU; and (ii) while each beam is activated, transmitting data over that beam to the plurality of UEs in accordance with a fair scheduling scheme.

Other embodiments include one or more of the following features. 2. During the first period of operation, each beam is activated for a time equal to $T_b$, wherein $T_b$ is a duration of time, e.g. $T_b$ is equal to n subframes of the signal from the BBU, wherein n is an integer (e.g. n=2). The fair scheduling scheme is a proportional fair scheduling (PFS) scheme. The first period of operation has a duration of no greater than $((N_b \times T_b)+(N_b-2) \times T_b)$ subframes, wherein $N_b$ is a positive integer equal to the number of beams in the set of beams. More specifically, the first period of operation has a duration of $N_b \times T_b$ subframes, where $N_b$ is a positive integer equal to the number of beams in the set of beams. Initiating channel sounding for each activated beam during the first period of operation involves sending cell-specific reference signal downlink pilots to all of the UEs among the plurality of UEs.

The method optionally also includes during a third period of operation following the second period of operation: (i) separately, in succession, and in synchronization with the subframe structure of the signal from the BBU, activating each beam of a plurality of beams from among the set of beams; and (ii) for each beam that is activated during the third period of operation, sending data to only the UE's among the plurality of UEs that are covered by that activated beam. The third period of operation immediately follows the second period of operation. During the third period of operation, each beam is activated for a time equal to $s_i \times T_b$, wherein $T_b$ is a duration of time, $s_i$ is an integer, and i is an integer index identifying a corresponding beam among the plurality of beams. The parameters $s_i$ are determined by the number of UEs covered by the corresponding beam. The time period $T_b$ is equal to n subframes of the signal from the BBU, wherein n is an integer, e.g. n=2. The plurality of beams is fewer in number than the number of beams within the set of beams. Each beam among the plurality of beams that is activated during the third period of operation, is activated for a period equal to a corresponding, integer number of subframes. The plurality of beams is selected from among the set of beams based on the number of UE's serviced by each of the beams among the set of beams. The duration of the second period of operation and the duration the third period of operation are equal. The duration of the second period of operation is $N_b \times m \times T_{sub}$, wherein $N_b$ is a positive integer equal to the number of beams in the set of beams, m is a positive integer, and $T_{sub}$ is a duration of a subframe within the signal from the BBU. For each beam that is activated during the third period of operation, sending data to only the UE's among the plurality of UEs that are covered by that activated beam is done in accordance with a proportional fair scheduling (PFS) scheme.

In general, in another aspect, the invention features a method of communicating with a plurality of devices (UEs) that are located within a serviced area. The method involves: defining a set of differently directed, narrow beams which collectively cover the serviced area, wherein each beam covers a different subset of the plurality of UEs within the serviced area; receiving a signal from a baseband unit (BBU), said signal having a subframe structure; and establishing a first period of operation and a second period of operation. During the first period of operation: (i) cycling through all of the beams of the set of differently directed beams one at a time by separately activating each beam in synchronization with the subframe structure of the signal from the BBU; and (ii) while each beam is activated, transmitting data over that beam to the plurality of UEs in accordance with a fair scheduling scheme. During the second period of operation following the first period of operation: (i) separately, in succession, and in synchronization with the subframe structure of the signal from the BBU, activating each beam of a plurality of beams from among the set of beams; and (ii) for each beam that is activated during the third period of operation, sending data to only the UE's among the plurality of UEs that are covered by that activated beam.

Other embodiments include one or more of the following features. During the first period of operation, each beam is activated for a time equal to $T_b$, wherein $T_b$ is a duration of time. $T_b$ is equal to n subframes of the signal from the BBU, wherein n is an integer (e.g. n=2). The fair scheduling scheme is a proportional fair scheduling (PFS) scheme. The second period of operation immediately follows the second period of operation. During the second period of operation, each beam is activated for a time equal to $s_i \times T_b$, wherein $T_b$ is a duration of time, $s_i$ is an integer, and i is an integer index identifying a corresponding beam among the plurality of beams. The parameters $s_i$ are determined by the number of UEs covered by the corresponding beam. The plurality of beams is fewer in number than the number of beams within the set of beams. Each beam among the plurality of beams that is activated during the second period of operation, is activated for a period equal to a corresponding, integer number of subframes. The plurality of beams is selected from among the set of beams based on the number of UE's serviced by each of the beams among the set of beams. The duration of the first period of operation and the duration the second period of operation are equal. The duration of the second period of operation is $N_b \times m \times T_{sub}$, wherein $N_b$ is a positive integer equal to the number of beams in the set of beams, m is a positive integer, and $T_{sub}$ is a duration of a subframe within the signal from the BBU. For each beam that is activated during the second period of operation, sending data to only the UE's among the plurality of UEs that are covered by that activated beam is done in accordance with a proportional fair scheduling (PFS) scheme.

BRIEF DESCRIPTION OF THE DRAWINGS

FIGS. 2a and 2b illustrates the differences between conventional and agile beamforming schemes, respectively.

The details of one or more embodiments of the invention are set forth in the accompanying drawings and the description below. Other features, objects, and advantages of the invention will be apparent from the description and drawings, and from the claims.

DETAILED DESCRIPTION

I. System Model

Figure 1:
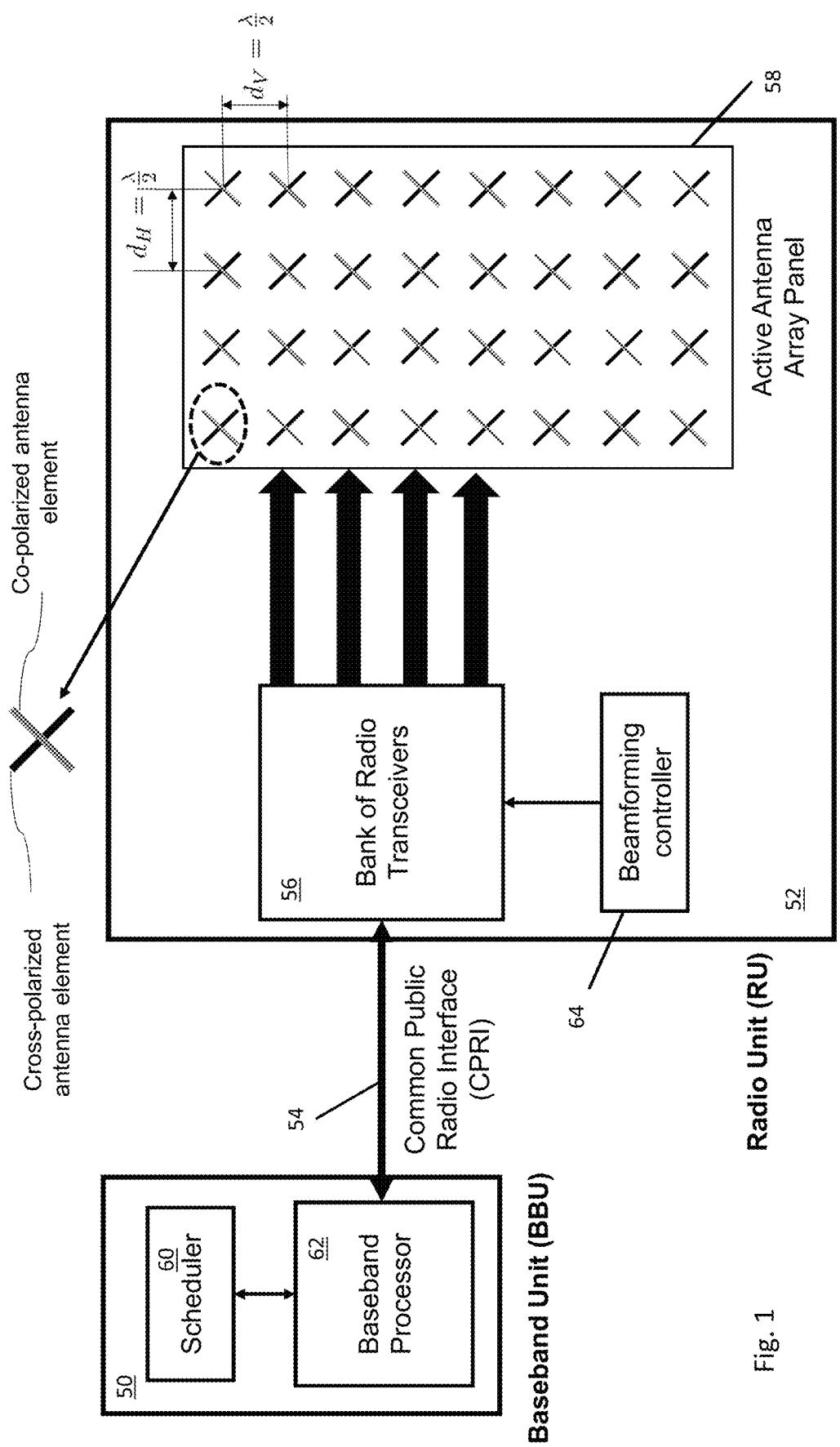
FIG. 1 shows the system architecture of an evolved NodeB (eNB).

Referring to FIG. 1, consider a single-cell scenario where an evolved NodeB (eNB) including a baseband unit (BBU) 50 and a radio unit (RU) 52 in and servicing a 120° sector.

The baseband unit (BBU) 50 is connected to the radio unit (RU) 52 using a common public radio interface (CPRI) 54. The BBU 50 includes a baseband processor 56 and a scheduler 60 for allocating resources among the UEs. The radio unit 52 includes underlying RF and beamforming circuitry including a bank of radio transceivers 56, an active antenna array panel 58 that are capable of coherent beamforming, and a beamforming controller 64 for selecting and applying analog beamforming precoding weights to the active antenna array panel to generate and control the generated beams.

The user communication devices or user equipment (UEs) (not shown) are distributed in the cell uniformly at random in the sector. The antenna array panel 58 is a rectangular array with 96 elements, arranged in a 12×4 grid of co-located dual-polarized antenna elements. The antenna panel is an active antenna array panel in which each port is connected to all the elements of the array utilizing the entire aperture for coherent RF beamforming. This is in contrast to conventional passive antenna systems where each port is connected only to a single column with no software control of the beamforming weights giving rise to fixed wide beams and lack of flexibility in forming narrow beams.

A typical LTE Release 8 (henceforth referred to as 'legacy LTE') system has 2 antenna ports (referred to as a 2T2R system) and is connected to either (a) all co-pol elements of the array, or (b) all x-pol elements of the array. Each antenna element has an RF integrated circuit (RFIC) capable of analog RF beamforming. Therefore, the array response of the signal from each LTE port can be controlled using 48 elements (either co-pol or x-pol). Let $b_{RF} \in \mathbb{C}^{N_r N_c \times 1}$ denote the RF analog precoding vector, with number of rows $N_r=12$ and number of columns $N_c=8$. It can be represented as: $b_{RF}=[bT1\ bT2\ \ldots\ bTN_c]$, where bTi represents the RF precoding weights applied to the $i^{th}$ column of the rectangular array. Indices $i=1, \ldots, N_c/2$ represent co-pol element columns, and $i=N_c/2+1, \ldots, N_c$ represent x-pol element columns. For each LTE port, the RF precoder has unit power gain, i.e., $|b_{RF}|_2=1$, where $|\cdot|_2$ represents the 2-norm. Azimuth and elevation angles are denoted by $\Theta$ and $\varphi$, respectively, where $\Theta \in (-60°, 60°)$ and $\varphi \in (0°, 90°)$.

Based on the RF precoder $b_{RF}$, the system is classified into (a) conventional, and (b) agile, as described below.

A. Conventional System

Each antenna element of the panel has an antenna radiation pattern with an azimuth beamwidth of 65° and elevation beamwidth of 8°. In a conventional system, each LTE port is connected only to a single column.

B. Agile System

In the agile system, each LTE port is connected to either (a) all the co-pol antenna elements, or (b) all the x-pol elements, of the rectangular array. Compared to the conventional system, this architecture gives an additional 3 dB of effective isotropic radiated power (EIRP) due to beamforming gain. Also, the system is 'agile' because the active antenna panel is capable of rapidly (every 1 ms) switching the beams by changing the RF precoder through software control while maintaining RF coherency across the entire aperture. Further details about such a system can be found in U.S. Pat. No. 9,485,770, entitled "Techniques for Achieving High Spectrum Efficiency in a Wireless System" and U.S. Pat. Pub. 2016-0021650, entitled "Method for Adaptive Beam Placement in Wireless Systems," both of which are incorporated herein by reference.

FIGS. 2(a-b) illustrate the differences between the beam patterns that are generated in the conventional system and the agile beamforming system. In the conventional system, the array produces a wide beam $B_{WB}$ that covers the sector (FIG. 2a). In the agile beamforming system, the array is capable of generating over a period of time differently directed, narrow beams, $i=0, \ldots, N$, that together cover the sector (FIG. 2b), with each beam generated at a corresponding different time, $t_i, \ldots, t_N$. The agile beamforming system can change the direction of the narrow beam in a timescale of the order of milli-seconds, i.e., $(t_i-t_{i-1}) \sim 1$ ms. In this example, the precoder that is applied to the full array aperture results in a corresponding narrow beam with $\Theta_{3dB}=25°$ and $\varphi_{3dB}=8°$, where $\varphi_{3dB}$ is the elevation 3 dB bandwidth and $\Theta_{3dB}$ the azimuth 3 dB bandwidth. Compared to other conventional cellular systems, the rapid beam switching capability of agile beamforming can provide an SINR gain to all users, provided the scheduler allocates resources to users in the regions experiencing the SINR gain.

II. Design of Agile Beam Switching and Scheduler

A. Agile Beam Codebook Design

In an LTE system, the agile beam needs to be swept or scanned across the sector in an efficient manner in order to serve all users, while facilitating CSI feedback and scheduling operations that are compatible with LTE. The described embodiment employs a codebook-based beamforming scheme according to which the agile beams point in $(\Theta(t), \varphi(t))$ whose values are taken from a codebook, i.e., $$\Theta(t) \in S_{az} = \{\Theta_1, \Theta_2, \ldots, \Theta_{Naz}\} \text{ and } \varphi(t) \in S_{el} = \{\varphi_1, \varphi_2, \ldots, \varphi_{Nel}\}.$$

1) Number of Elements in the Codebook

The codebook needs to ensure that almost all UEs in the sector experience an instantaneous SINR gain. Since the azimuth 3 dB beamwidth is ≈25°, for a 120° sector the number of azimuth codebook elements is $$N_{az} = \left\lceil \frac{120°}{25°} \right\rceil = 5.$$

For the sake of simplicity, consider a single elevation codebook element ($N_{el}=1$), i.e., no elevational control over the resulting beam

2) Interference in Adjacent Sectors

If an agile beam is placed too close to the cell-edge it will cause interference to the adjacent sectors. Therefore, the angles are chosen to ensure that it doesn't cause significant interference in adjacent sectors.

Based on the above considerations, in this described embodiment the codebooks are selected to be $S_{az}=\{-36°, -18°, 0°, 18°, 36°\}$ and $S_{el}=\{\varphi_0\}$, where typically $2° \leq \varphi_0 \leq 15°$.

Figure 3:
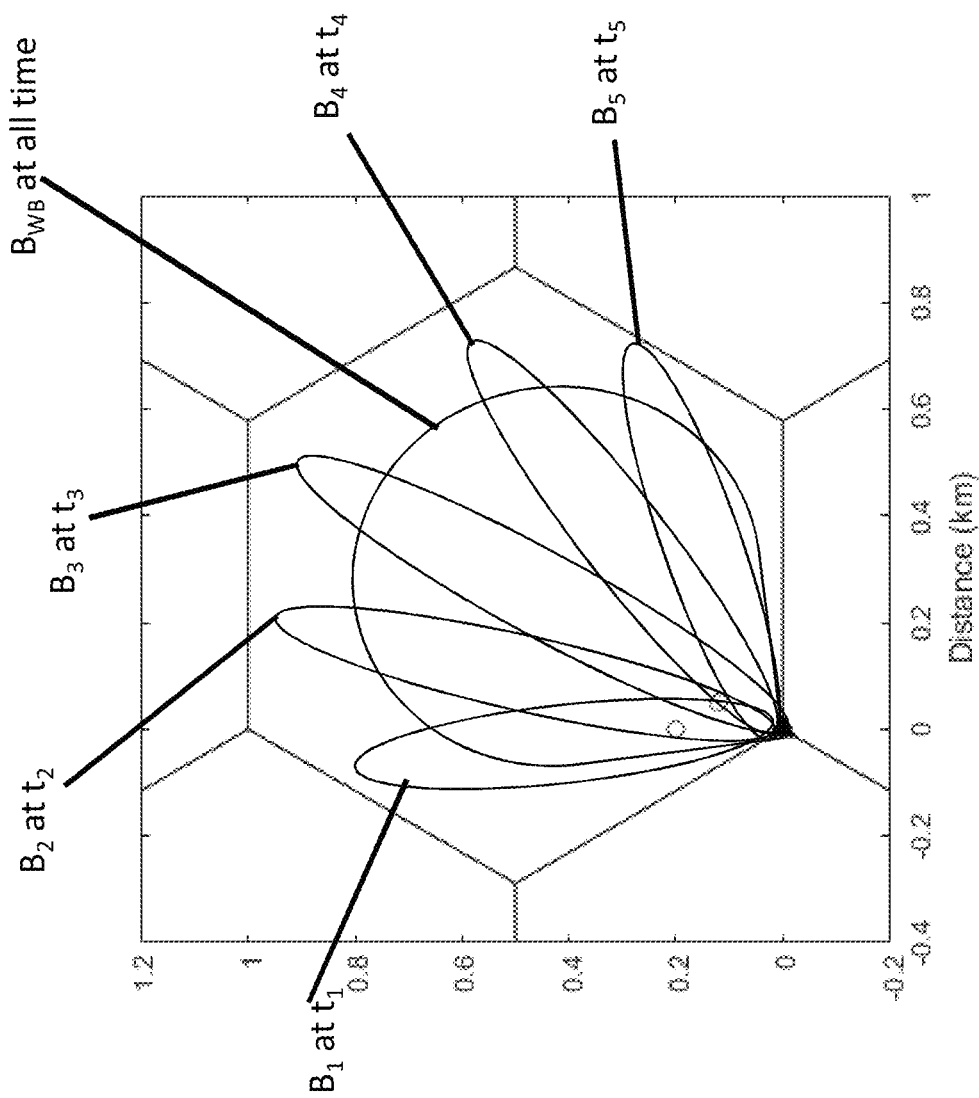
FIG. 3 illustrates agile beamforming with a legacy LTE system having two ports.

In LTE, crucial control signals need to be decoded by all active UEs every frame, such as synchronization signals (PSS/SSS), master information block (MIB), and system information blocks (SIBs). Assuming that the control signaling goes on LTE port 0 (which is typically the case in practical deployments), a 65° wide beam (henceforth referred to as 'wide beam') is used for LTE Port 0, to ensure it is received by all the UEs all the time. On the other LTE port, a 25° narrow beam is generated (henceforth referred to as 'narrow beam' or 'agile beam'). The agile beam covers different parts of the sector, but at different time slots. This is illustrated in FIG. 3 which shows the wide beam $B_{WB}$ generated at all times, and the sequentially generated beams $B_1$ to $B_5$ generated at times $t_1$ to $t_5$, respectively.

B. Sequence of CSI Feedback in Agile Beamforming

In LTE, link adaptation is done by changing the digital modulation scheme, the forward error correction (FEC) coding rate and the multi-antenna transmission mode (TM), based on the channel quality reported by the UE in the uplink. Channel quality is reported to the BBU via a CSI report that is fed back to the UE. The CSI report that is fed back by the UE consists of three parameters:

1. Channel quality indicator (CQI): It is an indication of the data rate that can be supported by the channel, after accounting for the signal-to-interference-plus-noise ratio (SINR).

2. Rank Indicator (RI): It represents the effective rank of the MIMO channel matrix between the eNB and the UE.

3. Precoding matrix indicator (PMI): It signals the codebook index of the optimal precoding vector/matrix.

CSI is estimated by the UE based on analyzing the cell-specific reference signal (CRS) downlink (DL) pilots or pilot signals that are sent to the UE by the BBU during what is referred to as channel sounding. The UE can feed back the CSI report either on (a) physical uplink (UL) control channel (PUCCH), termed as periodic reporting, or (b) physical uplink shared channel (PUSCH), termed as aperiodic reporting. The CSI reporting periodicities supported by the LTE standard ranges from 2 to 160 ms. In addition, the CSI report typically follows after the actual channel measurement with a delay of 8 ms. Note that the standard mentions that "If the UE reports in an available uplink reporting instance at subframe (SF) #n based on CSI estimation at a downlink subframe not later than SF #(n−4), this reported subband or wideband CQI cannot be applied at the eNB downlink before SF #(n+4)". (For more details, refer Tables 9.3.1.1.1.3-1, 9.4.1.1.1.3-1 and 9.5.1.1.3-1 in 3GPP, "LTE; Evolved Universal Terrestrial Radio Access (E-UTRA); User Equipment (UE) conformance specification; Radio transmission and reception; Part 1: Conformance testing," ETSI TS 136 521-1 v13.1.0, May 2016.)

The uplink of the LTE protocol flexibly accommodates multiple UE reports in the same subframe (for instance, 24 UEs/PUCCH region can be supported for CSI and HARQ ACK/NACK feedback in a 1.4 MHz uplink subframe). The channel state information (CSI) report fed back by each user is one of the factors considered by the scheduler for resource allocation, in addition to a multitude of other factors such as traffic conditions, scheduling history, number of scheduling requests and latency. In typical BBUs, a simple proportional fair scheduler (PFS) is implemented.

Figure 4:
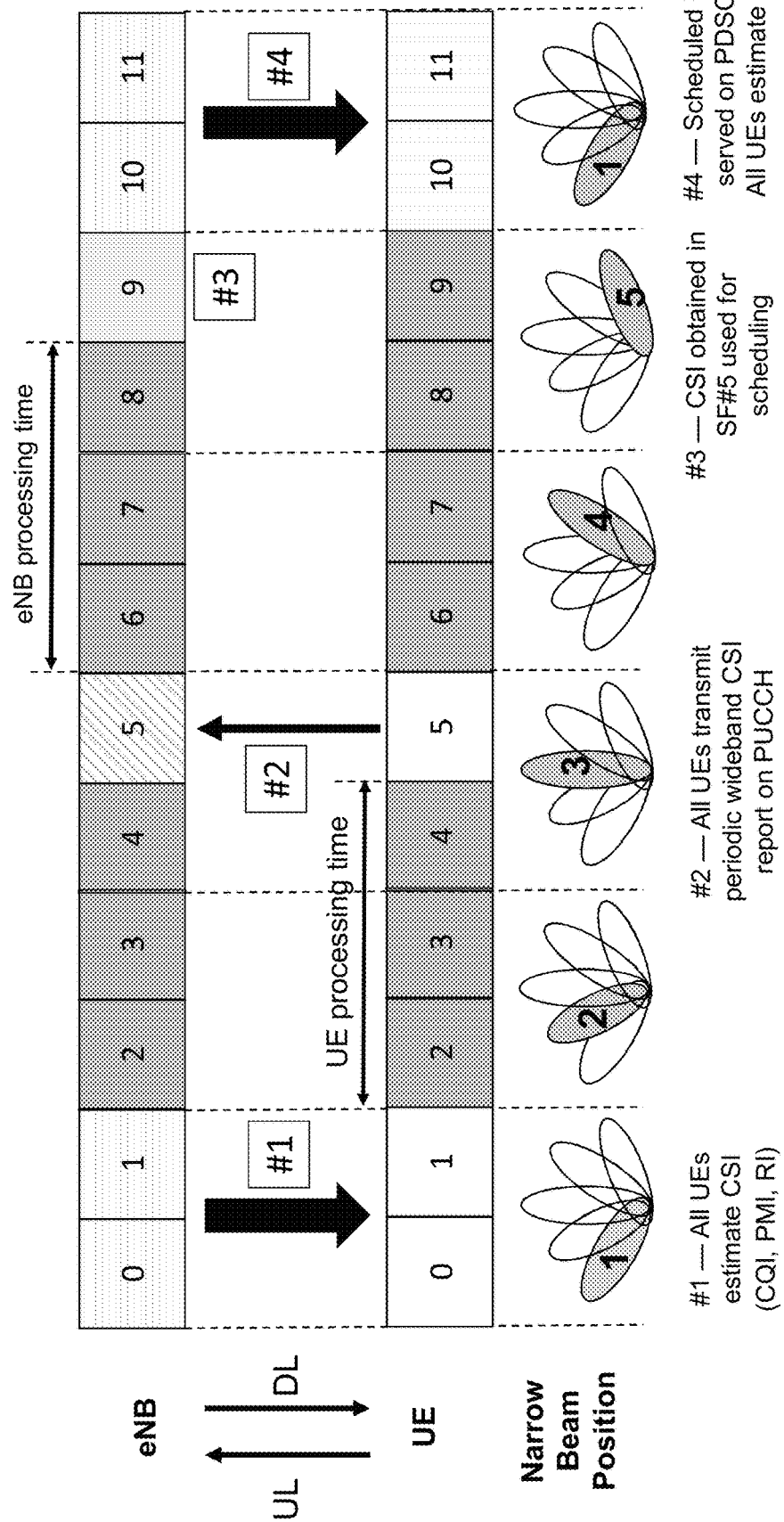
FIG. 4 illustrates CSI feedback in legacy LTE systems for a CSI reporting periodicity of 2 ms and the number of agile beams $N_b$=5.

Using a codebook of agile beams as defined above, the delay and periodicity in the CSI feedback mechanism of LTE can be leveraged to switch between different beams in the codebook synchronously with the LTE subframes such that UEs across the entire sector experience an SINR boost due to the narrow beams. For simplicity, consider agile beams that are switched in a round-robin manner. As noted above, FIG. 3 qualitatively shows the case of 5 narrow beams used to cover the entire sector by agile switching. FIG. 4 shows the sequence of agile beamforming with CSI feedback in LTE, for a CSI reporting periodicity $T_{CSI}$=2 ms. Without loss of generality, consider the CSI feedback for UEs that lie in the region covered by beam 1 (in FIG. 4) using $N_b$=5 agile beams, where each agile beam is used for a duration of $T_b$=2 ms. The reasoning for this choice will be clear from the following sequence of steps which are shown in FIG. 4:

1. In subframes 0 and 1, narrow beam 1 is active on Port 1 transmitting downlink CRS for CSI estimation purposes.

2. All UEs process the CRS pilots, perform channel estimation and derive the CSI (CQI, PMI and RI), which results in a processing delay of 3 milliseconds. In subframe 5, each UE feeds back their CSI in a periodic CSI report on the physical uplink control channel (PUCCH).

3. The periodic CSI reports sent on the PUCCH are received by the eNB in subframe 5 and decoding and processing of the CSI reports incur a processing delay of 3 milliseconds at the eNB. At subframe 9 (right before the agile beam sequence is back to beam 1 in subframe 10), CSI of all UEs for beam 1 is available to the scheduler.

4. The scheduler takes an extra millisecond for further processing and is ready to serve scheduled UEs in agile beam 1 in subframes 10 and 11.

5. While serving scheduled users in subframes 10 and 11, all UEs again receive downlink pilots on agile beam 1 for refreshed CSI estimation, and this sequence repeats itself every 10 milliseconds.

Note that (a) the CSI delay in this scheme is 8 ms, and (b) the UE is effectively reporting the CSI for each agile beam, when the beam duration $T_b$ is configured by the eNB to be equal to $T_{CSI}$. In this case, since $T_{CSI}$=2 ms and the CSI delay $T_{CSI,del}$=8 ms, the total time elapsed between downlink pilot reception at the UE, and CSI availability for the scheduler is 10 ms.

In order to have a sustainable periodic sequence of agile beam allocation and CSI feedback, allocate (10 ms−$T_{CSI}$)/($T_b$)=4 additional beams (marked 2,3,4 and 5) each with a duration of $T_b$=$T_{CSI}$=2 ms as shown in FIG. 4. For $N_b$=5 beams, downlink pilots are sent on agile beam j during subframes (j−1)$T_{CSI}$ to (j$T_{CSI}$−1) for j=2, ... , 5, and the corresponding CSI feedback is available at subframe (j$T_{CSI}$−1)+8. To generalize for a different value of $T_{CSI}$=$T_b$ and number of agile beams $N_b$, 1. Agile beam k is active on Port 1 in subframe ((k−1)$T_{CSI}$+l) for l=0, 2, ... , $T_{CSI}$−1 and k=1, 2, ... , $N_b$ to serve users as well as send downlink pilots, 2. All UEs estimate CSI during subframes ((k−1)$T_{CSI}$+1) for l=0, 2, ... , $T_{CSI}$−1 and k=1, 2, ... , $N_b$, and send their periodic CSI reports in subframe (k$T_{CSI}$+3), 3. The eNB receives the CSI reports from all UEs, and processes them until subframe (k$T_{CSI}$+7), 4. The CSI of all UEs for agile beam k will be available to the scheduler at subframe (k$T_{CSI}$+8), 5. The scheduler uses the CSI available at subframe (k$T_{CSI}$+8) to schedule and serve users using agile beam k during subframes (($N_b$+k−1)$T_{CSI}$+1) for l=0, 1, ... , $T_{CSI}$−1.

Notice that this is a sustainable sequence of operations for all k=1, 2, ... , $N_b$, as long as ($T_{CSI}$+$T_{CSI,del}$)≤$N_b T_{CSI}$.

The synchronization between $T_b$ and $T_{CSI}$ will require some minimal information exchange between the BBU and the RU. However, this would be a once-and-for-all information exchange and it will not require major software/hardware development efforts at the BBU and RU nodes.

What follows are descriptions of two schemes which differ in terms of coordination between the beamformer and the scheduler.

C. Agile Beamforming without BBU-RU Coordination

In this scheme, the scheduler behaves independently of the agile beamforming sequence. Consider a proportional fair scheduler (PFS), which assigns resources to the $k^{th}$ user such that:

$$k = \underset{m}{\operatorname{argmax}} F_{PFS}(t) = \frac{R_m(t)}{\overline{R_m}(t)} \text{ for } m = 1, 2, \ldots, K.$$

Here, $F_{PFS}(t)$ is called the 'fairness index', $R_m(t)$ is the instantaneous data rate if user m is scheduled in timeslot t, and $\overline{R_m}(t)$ its long-term average data throughput. The denominator term $\overline{R}_k(t)$ induces 'fairness' in the system. Intuitively, this is because users with relatively worse channel conditions get less average throughput and hence, have a better chance of getting served. This is in contrast to a greedy scheduler, where the user with the best channel conditions get served, thus putting UEs with impaired channels at a disadvantage. Owing to the nature of PF scheduling, it is possible for a UE to be scheduled in a period of no narrow beam coverage.

In order to synchronize beam switching with the LTE subframe, the RU gets the LTE frame timing from the packets over the common public radio interface (CPRI) with no BBU co-ordination. Both BBU and RU operations will be in sync with the frame timing, but the user scheduling and agile beam switching decisions are made independently at the BBU and RU, respectively. As mentioned earlier, the RU still needs to know $T_{CSI}$ from the BBU to set $T_b = T_{CSI}$ which is a one-time information exchange requiring no major BBU upgrade. This is an important baseline because it represents the scenario where RUs and BBUs are provided by different equipment manufacturers and do not necessarily co-operate with each other. Although there are ongoing efforts to standardize the BBU-RU interface for 5G networks, such co-operation does not exist in legacy LTE systems.

D. Agile Beamforming with BBU-RU Coordination

In this scheme, the BBU cooperates with the agile beamformer in the RU to: (a) find the best narrow beam in the codebook for each UE; (b) always schedule UEs that are covered by the current agile beam: and (c) allocate agile beams in proportion to the user traffic. What follows is a detailed description of the methodology of this scheme.

1) User-to-Beam Association

In the case of no BBU-RU coordination, PFS is not guaranteed to schedule the user that would benefit from the SINR gain. To overcome this, the scheduler needs to know which UEs experience an SINR gain for each narrow beam. To determine this, the scheduler collects the CSI feedback for all users for all agile beams as described above. User k is said to be associated with beam i if: $i = \arg\max_{i'} R_{k,i'}$ for $i' = \{1, 2, \ldots, N_b\}$. Here $R_{k,i'}$ is the achievable throughput if the $k^{th}$ user is scheduled in beam i'. The scheduler estimates this based on the CSI fed back for beam i'. After the scheduler has acquired the CSI for all agile beams, each UE will be 'associated' with a virtual subsector covered by beam i. Set $S_i$ contains the user indices of users associated with beam i for $1 \leq i \leq N_b$.

2) Per-VS Proportional Fair Scheduler

In order to guarantee that a UE experiencing an SINR gain is scheduled, the proportional fair scheduler is slightly modified by constraining the search space to UEs lying in the region covered by the agile beam. This will be referred to as a Per-virtual subsector PFS, which allocates resources to user $j_i$ on agile beam i such that $$j_i = \operatorname{argmax}_{j \in S_i} \frac{R_j(t)}{\overline{R}_j(t)} \text{ for } j = 1, 2, \ldots, K_i \text{ and}$$

$$i = 1, 2, \ldots, N_b.$$

3) Agile Beam Allocation

If users are concentrated in regions (hotspots) covered only by a few agile beams in the codebook, then it is not efficient to allocate equal time for all agile beams. This is the key idea behind agile beam allocation in the context of this scheme.

Suppose there are $K_i = |S_i|$ users associated with beam i, such that $K = \sum_{i=1}^{N_b} K_i$. Then, this scheme allocates a fraction of the total time to agile beam i. Here, the fraction $\eta_i (K_i/K)$ and hence, $\sum_{i=1}^{N_b} \eta_i = 1$.

In practical deployments, the user population distribution tends to change with time. So, it makes sense to allocate beams only for a finite time-horizon into the future and adapt beam allocation in response to the changes by 'learning' from CSI measurements. Suppose the agile beam sequence needs to be designed for $T_{abs}$ number of subframes. In that case, the following requirement exists: $T_{abs} \eta_i \in \mathbb{Z}^+$ for $i = 1, 2, \ldots, N_b$. In order to ensure that every agile beam stays in position for a multiple of $T_{CSI}$ subframes so that the CSI can be estimated and fed back reliably, $T_{abs}$ is constrained to be of the form $T_{abs} = a \, T_{CSI}$ where $a \in \mathbb{Z}^+$. Therefore, agile beam i is allocated $T_i = a_i T_{CSI}$ subframes in total where $a_i \in \mathbb{Z}^+$ and $\sum_{i=1}^{N_b} a_i = a$, such that $$\eta_i = \frac{K_i}{K} \approx \frac{a_i}{a}$$

for a, $a_i \in \mathbb{Z}^+$. The final step is to design the sequence in which the beams are used for serving users and CSI feedback, for subsequent agile beamforming operations.

4) Agile Beam Sequence

Note that allocating agile beams proportionally to the number of users $K_i$ associated with agile beam $i = 1, 2, \ldots, N_b$ can potentially disrupt the sustainability of the agile beam sequence presented above. This is because for proportional beam allocation to work, the CSI feedback for all agile beams has to be processed by the scheduler in a timely manner to (a) associate UEs to their best agile beams, and (b) allocate resources to the appropriate UEs. If timely CSI feedback is unavailable for even one of the agile beams, the scheduler will not have all the information needed to allocate downlink resources to the appropriate user. The CSI unavailability problem is highly likely when $T_{CSI} = T_b$ is low (e.g. $T_{CSI} = 2$ ms) and users are concentrated in a few virtual subsectors. This can be alleviated by partitioning the sequence into the following stages:

1. Initialization stage: In order to get an initial CSI estimate for all beams, equal airtime is provided to all agile beams for $N_b T_b$ subframes. Initiated at subframe 0, this stage runs only once ensuring initial estimates to be available at $(N_b T_b + 7)$. During the initialization stage, a proportional fair scheduler is used to allocate downlink resources to users.

2. Round-robin (RR) CSI learning stage: From subframes $N_b T_b$ to $2 N_b T_b - 1$, each agile beam is allocated equal airtime (as discussed above) in a round-robin manner with downlink CRS pilots transmitted on each beam to acquire uplink CSI feedback (available at subframe $2 N_b T_b + 7$) and learn the UE population. At the same time, users are served data using (a) proportional-fair scheduler if CSI for agile beams is unavailable, or (b) per-VS proportional fair scheduler based on CSI for all agile beams from past measurements.

3. Non-uniform (NU) beam allocation stage: The CSI reports from the learning stage available at subframe ($N_bT_b$+7) are used to determine the best agile beam for each user. The scheduler then determines $K_i$ and $a_i$ for i=1, 2, . . . , $N_b$. Since agile beams have already been allocated equal air time during the round-robin stage, the scheduler determines the fraction $\eta'_i$ for agile beam i such that the resultant fraction of air time averaged over the round-robin and the non-uniform stage is $a_i/\Sigma_{i=1}^{N_b}a_i$. This fraction and the beam sequence are communicated to the RU, which then generates the appropriate agile beams to serve users during subframes $2N_bT_b$ to $3N_bT_b-1$.

Once this sequence is completed, the round-robin CSI learning and non-uniform beam allocation stages are alternately executed for $N_bT_b$ subframes each. The round-robin stage from subframes $lN_bT_b$ to $(l+1)N_bT_b-1$ ensures that CSI and optimal user-beam association for all UEs is available for non-uniform beam allocation during subframes $(l+2)N_bT_b$ to $(l+3)N_bT_b-1$. The following example clearly illustrates this scheme.

III. EXAMPLE

Consider a sector utilizing $N_b$=5 agile beams with K=20 UEs. Table I shows the number of subframes allocated to each beam for a time horizon of $T_{abs}$=20 subframes. Consider $T_{CSI}$=2 ms, so that a=10. The fraction of time allocated to each beam is approximated by ($a_i/a$), and the subframes allocated to each beam in the round-robin and non-uniform stages are calculated in Table I.

TABLE I

Allocation of agile beams in example

| Beam (i) | $K_i$ | $\eta_i = \dfrac{K_i}{K}$ | $\dfrac{a_i}{a}$ | $T_i$ | SFs allocated (RR stage) | SFs allocated (NU stage) |
|---|---|---|---|---|---|---|
| 1 | 3 | 0.15 | 0.2 | 4 | 2 | 2 |
| 2 | 5 | 0.25 | 0.2 | 4 | 2 | 2 |
| 3 | 1 | 0.05 | 0.1 | 2 | 2 | 0 |
| 4 | 5 | 0.25 | 0.2 | 4 | 2 | 2 |
| 5 | 6 | 0.3 | 0.3 | 6 | 2 | 4 |

Figure 5A:
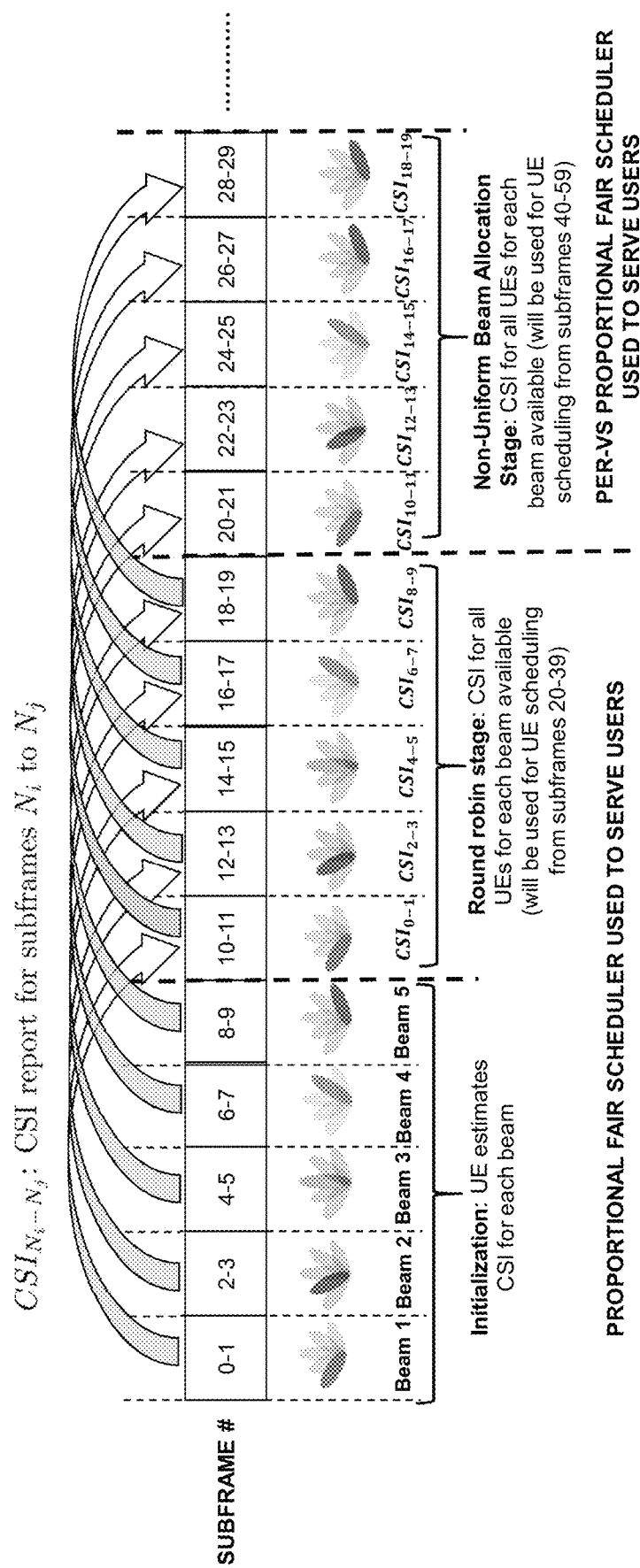
FIG. 5(a) shows the initialization, round robin, and non-uniform beam allocation stages.

FIG. 5(a) shows the initialization, round robin and non-uniform beam allocation stages. As previously described in reference to FIG. 4, the RU generates Beam 1 in subframes 0-1; it sends the CRS pilots during that time period; and the results are available for enabling the BBU to allocate resources to Beam 1 when it is next generated in subframes 10-11. Similarly, the RU generates Beam 2 in subframes 2-3; it sends the CRS pilots during that time period; and the results are available for enabling the BBU to allocate resources to Beam 2 when it is next generated in subframes 12-13. This is sequence repeat for Beam 3, Beam 4, and Beam 5 in the remaining subframes of this period of operation.

The initialization stage ensures that the CSI feedback necessary to implement the first non-uniform beam allocation stage is available. The RR learning stage succeeding the initialization stage ensures that CSI feedback is available to implement subsequent non-uniform beam allocation stages.

Figure 5B:
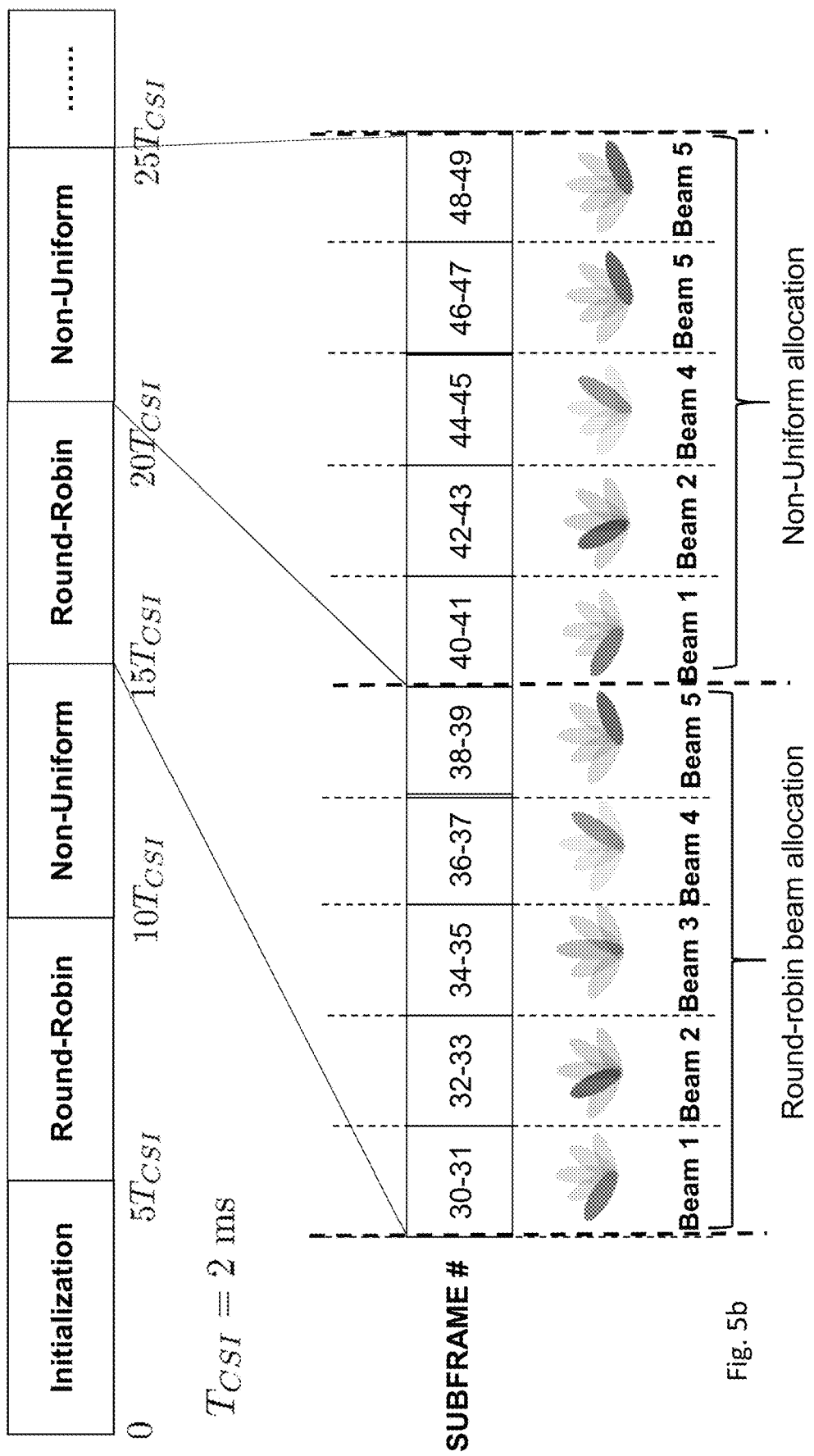
FIG. 5(b) illustrates the sustainability of the subsequent RR learning and non-uniform beam allocation stages.

FIG. 5(b) illustrates the sustainability of the subsequent RR learning and non-uniform beam allocation stages. The additional advantages of having a round-robin stage is (a) it simplifies protocol complexity in the context of CSI acquisition, and (b) as users become active/inactive in a virtual subsector, a dedicated RR learning stage enables the network to perform online learning and adaptation to time-varying user traffic. It is important to note that while CSI feedback is being acquired for all beams during the round-robin stage, users will be served using a Per-VS PFS once the user-to-beam association is complete. Until then, a conventional PFS is used to allocate downlink resources.

IV. Summary of Operational Phases

Figure 6A:
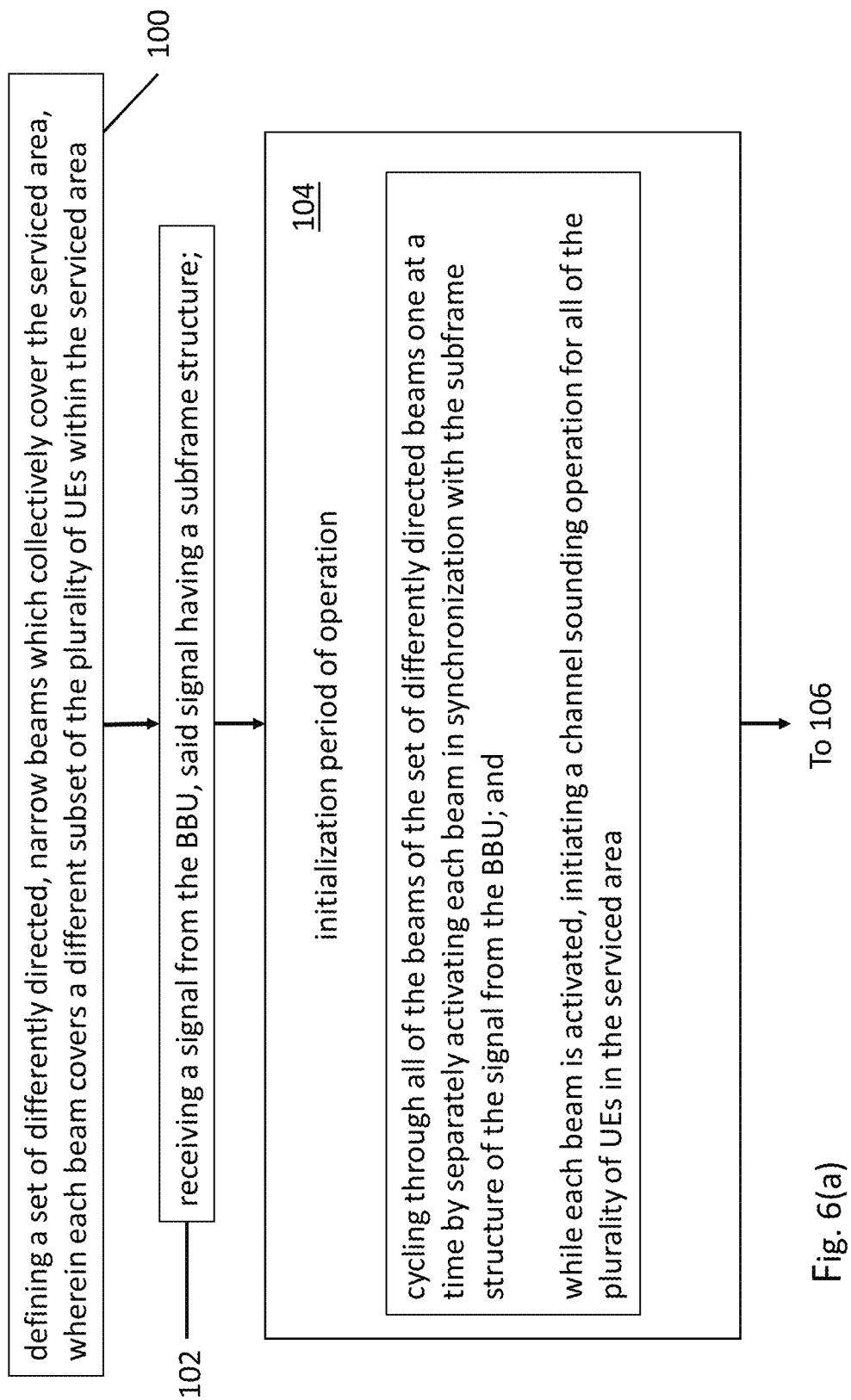
FIGS. 6(a)-(b) present a flow chart of the operation with BBU-RU coordination.
Figure 6B:
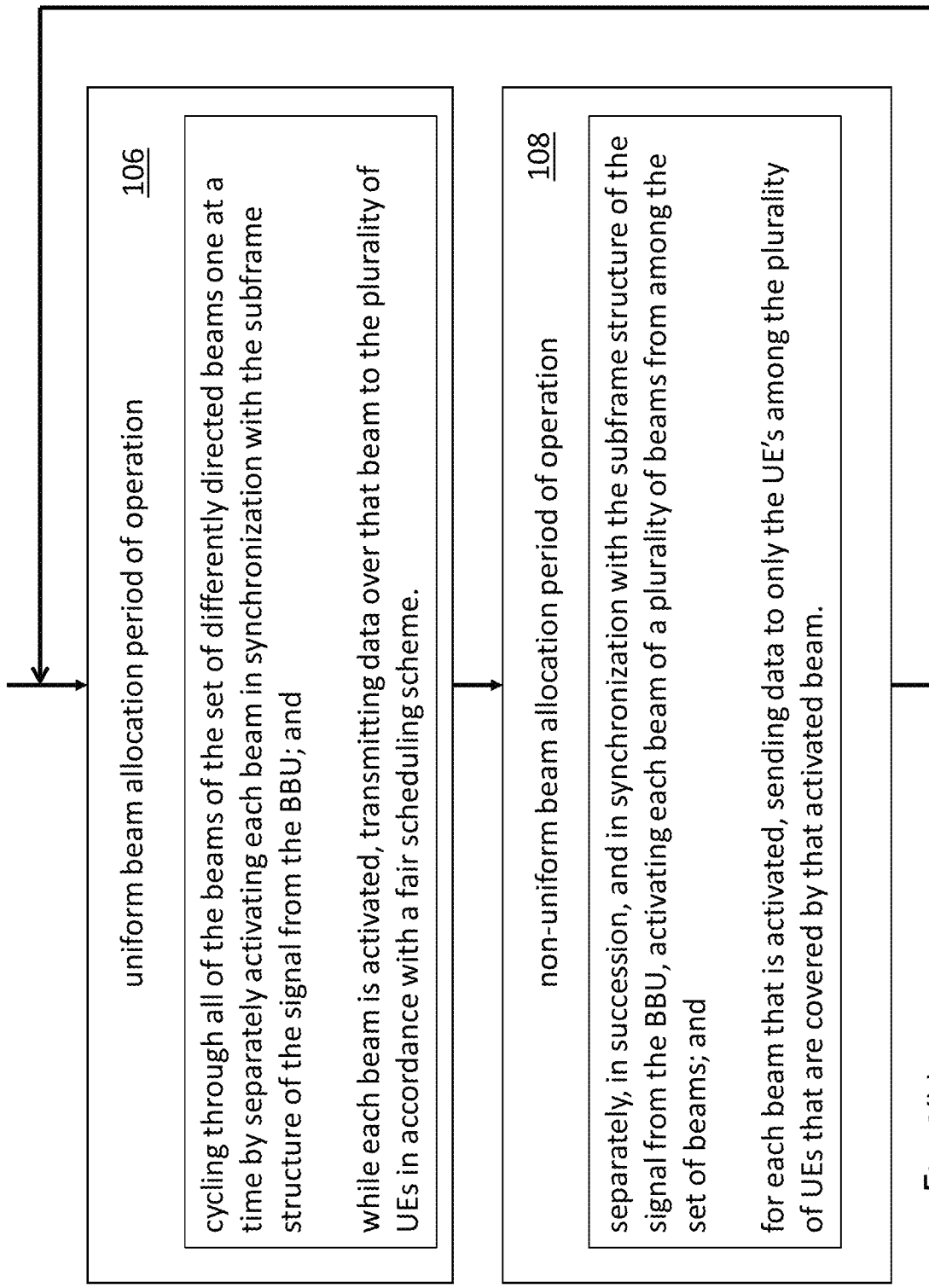

FIGS. 6(a)-6(b) summarize in the form of a flow chart the steps that are involved implementing the above-described procedures in the case in which there is BBU-RU coordination.

Preliminarily, a set of differently directed, narrow beams is defined such that they collectively cover the serviced area in which the population of UEs are located (100). Each beam within the set of beams covers a different subset of the population of UEs within the serviced area. During operation, the radio unit receives a signal from the baseband unit (BBU) that has a subframe structure, wherein each subframe has a duration of, for example, 1 ms (102). At the very start of the procedure, there is a first phase (or period) of operation (104), which was referred to previously as the initialization phase, during which the UEs are discovered (104). This is followed by a second phase of operation (106) and then a third phase of operation (108). The first, second, and third phases of operation have the same duration.

During the first and second phases of operation, the beams are scanned over the service area by activating each beam in succession. During these two phases each beam is activated for a specified number of subframes, $T_b$ (e.g. 2 subframes or 2 ms). Thus, assuming that there are $N_b$ beams, the serviced area can be completely scanned in $N_bT_b$ subframes. So, the duration of the phases of operation are equal to at least $N_bT_b$ subframes. The number of beams and the duration of activation for the beams are selected so that $N_bT_b$ is sufficiently long so that scheduling information derived from channel sounding that takes place during the first beam is available when the second phase of operation starts.

During the first phase of operation, the RU cycles through all of the beams of the set of differently directed beams one at a time by separately activating each beam in synchronization with the subframe structure of the signal from the BBU. While each beam is activated, the BBU initiates channel sounding for all of the UEs in the serviced area. It does this by sending cell-specific reference signal (CRS) downlink pilots to all of the UEs.

During a second period of operation immediately following the first period of operation, the RU again cycles through all of the beams of the set of differently directed beams one at a time by separately activating each beam in synchronization with the subframe structure of the signal from the BBU. It does this in the same order in which the cycling occurred during the first phase. Thus, as each beam is ready to be activated and as result of the duration of the first phase of operation, the scheduling information has been made available in the BBU for scheduling communications with the UEs when the beam is next scheduled to be activated. So, as each beam is activated during this second phase, the BBU sends data over that activated beam to the UE's in the serviced area in accordance with the scheduling scheme that the BBU uses, e.g. a PFS scheme.

Upon completing the activation of all beams during the second phase, the third phase of operation begins. By this time, the BBU has had sufficient time to receive and analyze the feedback from channel sounding to determine the geographical distribution of the UEs within the serviced area (i.e., the best beam for each UE). During the third phase of operation, the RU separately, in succession, and in synchronization with the subframe structure of the signal from the BBU, activates beams from among the set of beams. For each beam that is activated, the BBU sends data over that beam to only the UE's among the plurality of UEs that are covered by that beam. As previously note, according to one approach, it is possible that one or more of the beams will not be activated during this phase and other beams will be activated more than once, e.g. for an integer number of $T_b$'s, depending upon the extent to which the UEs are located in clusters or hot spots.

After completing the third phase of operation, the BBU enters a loop in which it keeps repeating the second and third phases, as indicated. Alternatively, the BBU can repeat the third phase multiple times before branching back to repeat the second phase of operation. This might be desirable if the population of UEs and/or their locations do not change often. On the other hand, if the UEs move around, it would be more appropriate to perform the operations of the second phase more frequently to update awareness of how the distribution of UEs has changed.

V. Numerical Results

A link-level simulation study was conducted for a legacy LTE eNB with two antenna ports, with the system parameters shown in Table II.

TABLE II

| Parameter | Value |
| --- | --- |
| Antenna configuration | 96-element rectangular array (12 × 4 grid) with co-located co-pol and x-pol elements, $d_h = d_v = \lambda/2$ spacing |
| Carrier frequency ($f_c$) | 2 GHz |
| LTE system bandwidth | 1.4 MHz |
| Transmission mode | TM 4 |
| Power per PDSCH RE | 15.2 dBm |
| Power per CRS RE | 18.2 dBm |
| Channel model | 3GPP 3D-UMa channel model |
| CSI reporting period | 2 ms |
| CSI delay | 8 ms |
| Scattering environment | Near Line-of-sight (LoS) |
| Cell radius | 1.732 km |
| Traffic | Full buffer |
| Scheduling granularity | 1 UE per TTI (full LTE bandwidth) |

The results are presented for the following schemes:
1. Conventional system.
2. Agile beamforming without BBU-RU coordination.
3. Agile beamforming with BBU-RU coordination.

Users were distributed uniformly at random in the azimuth in a 120° sector, with a fixed elevation with respect to the antenna panel. Proportional fair scheduling (PFS) was used in the conventional and the uncoordinated agile beam schemes. For coordinated agile beamforming, a per-subsector proportional fair scheduler was used.

Figure 7A:
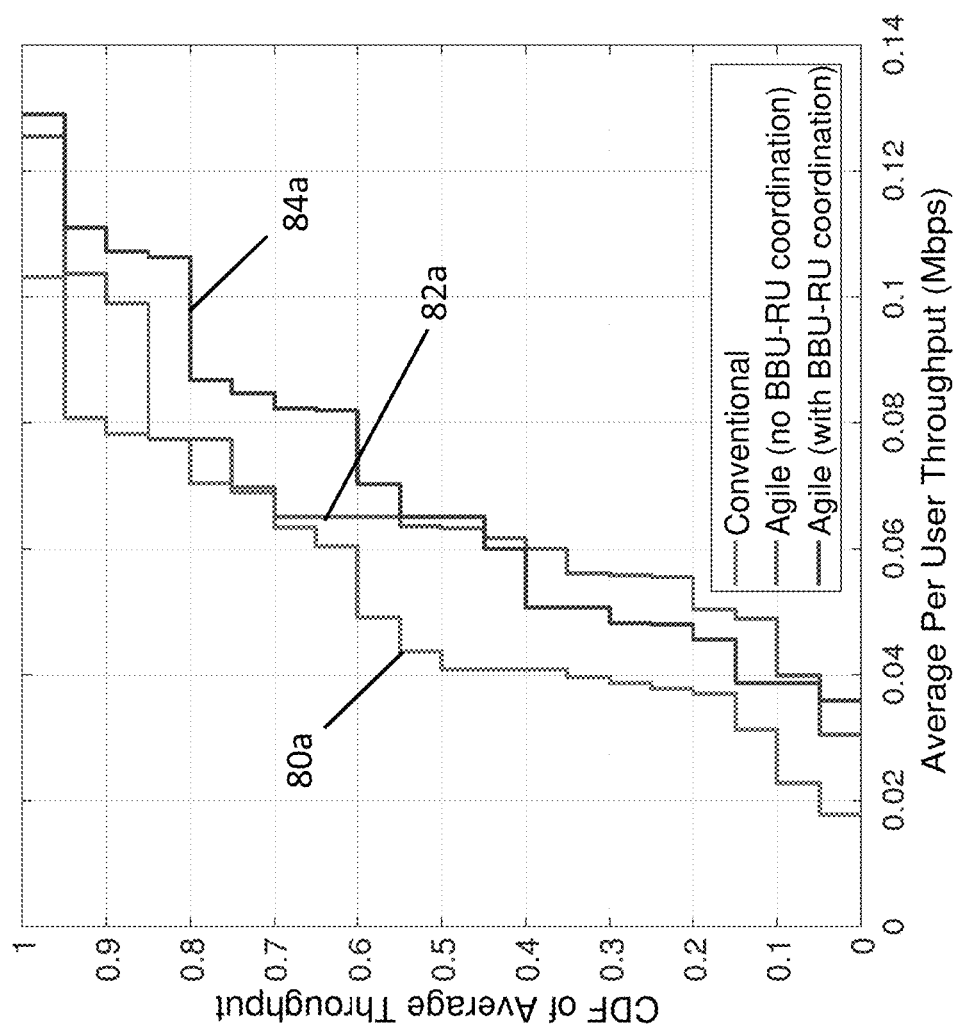
FIGS. 7(a)-(d) present a comparison of throughput performance of conventional, uncoordinated, and coordinated agile beamforming schemes.
Figure 7B:
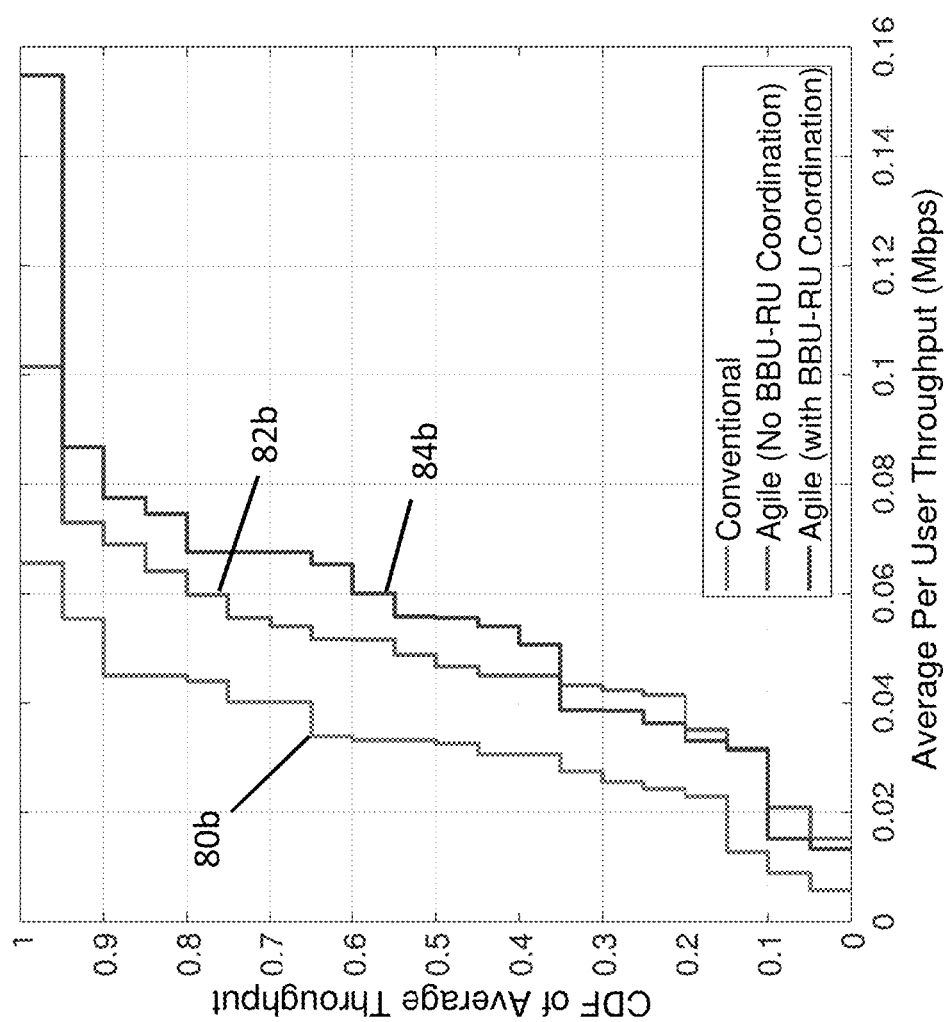

FIGS. 7(a)-7(b) show the CDF of per-user throughput of all schemes for 20 UEs uniformly distributed in azimuth at 750 m and 1000 m, respectively. In FIG. 7(a), curve 80a corresponds to a conventional approach, curve 82a corresponds to the agile beam approach with no BBU-RU coordination, and curve 84a corresponds to the agile beam approach with BBU-RU coordination. In FIG. 7(b), curve 80b corresponds to a conventional approach, curve 82b corresponds to the agile beam approach with no BBU-RU coordination, and curve 84b corresponds to the agile beam approach with BBU-RU coordination. Note that the agile beamforming schemes outperform the conventional system. BBU-RU coordination yields an overall throughput improvement, compared to its uncoordinated counterpart. Comparison of the sum and average per-user throughput is shown in Table III.

TABLE III

Performance of agile beamforming versus conventional systems

| | Uncoordinated | | Coordinated | |
| --- | --- | --- | --- | --- |
| | Distance | | | |
| | 750 m | 1000 m | 750 m | 1000 m |
| Average per-user throughput gain | 27% | 51% | 34% | 74% |
| Sum throughput gain | 39% | 66% | 46% | 80% |

Observe that the performance gain increases at the cell-edges (1000 m). This is because in general, SNR gain in a low SINR region (cell-edge) translates to a higher rate gain. For LTE, the transport block size (TBS) allocated to the scheduled UE increases steeply at lower MCS values (typical at the cell-edge), which explains the trend in Table III.

In order to investigate the proportional fair scheduler performance in the case of no BBU-RU coordination, two metrics are defined that assist in understanding the extent to which UEs experiencing an SINR gain are scheduled during an agile beam. They are:

1. Success rate of UEs scheduled in its best beam ($\rho_1$): This measures the fraction of subframes when a UE from $S_i$ is actually scheduled when i is active.

2. Success rate of UEs scheduled in the best two beams ($\rho_{1,2}$): Let $j = \mathrm{argmax}_{i' \neq i} R_{k,j'}$ be the second best beam for user $k \in S_i$. ($\rho_{1,2}$) measures the fraction of times a UE is actually scheduled when either of beams i and j is active.

Figure 7C:
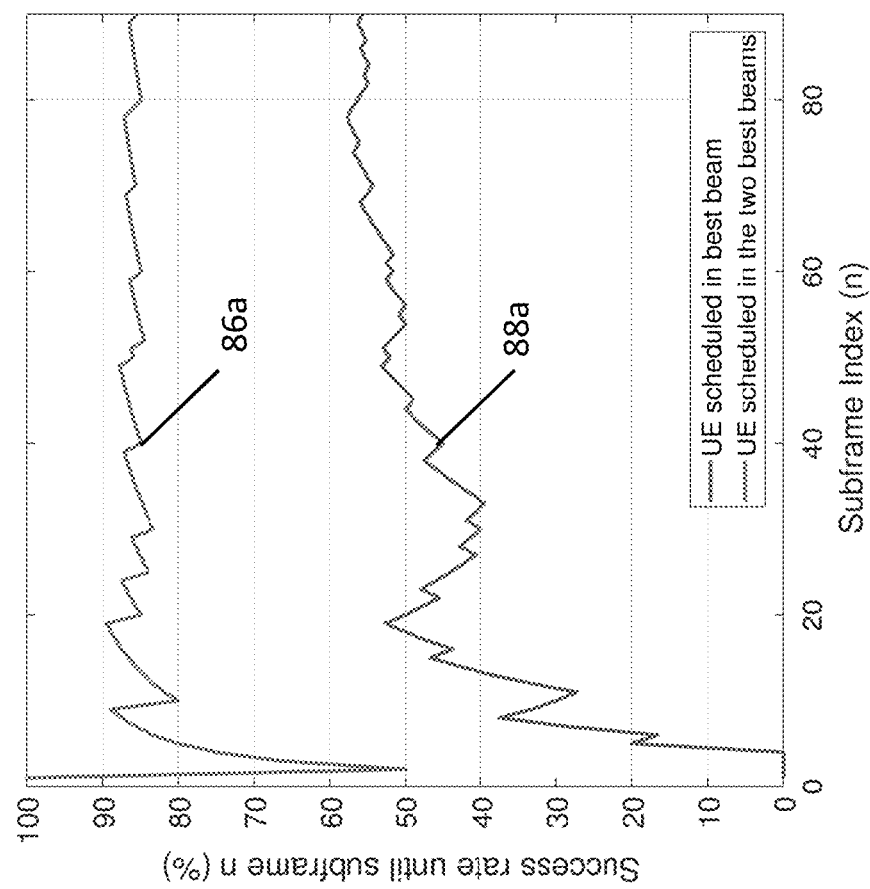
Figure 7D:
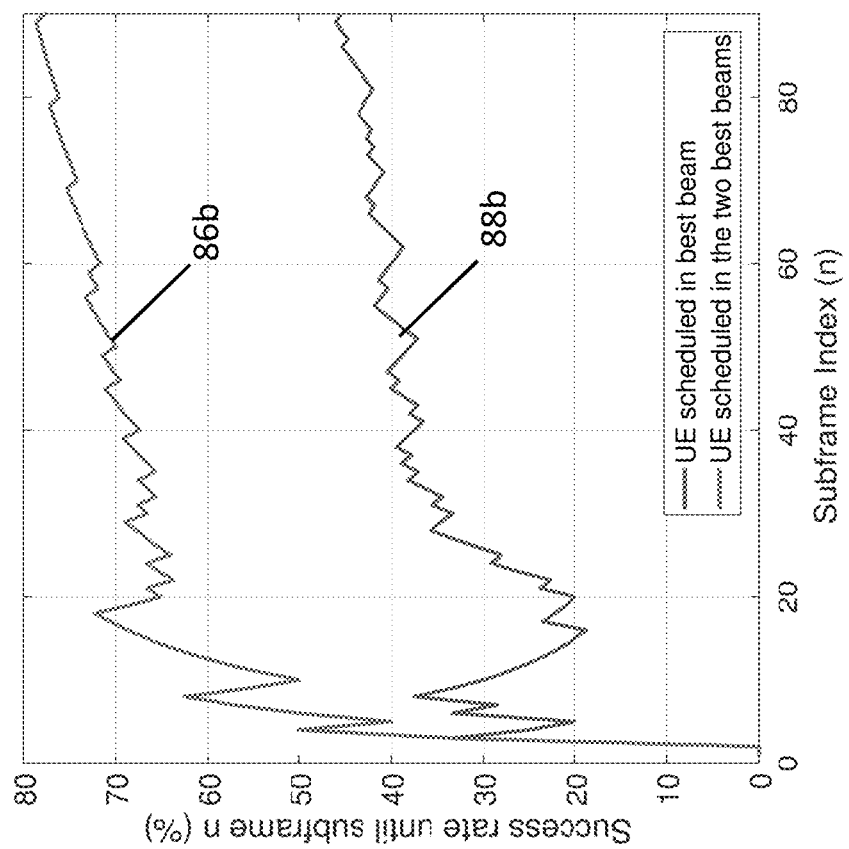

FIGS. 7(c)-7(d) show the scheduling performance of the uncoordinated agile beamforming scheme. Specifically, they show the trend of $\rho_1$ and $\rho_{1,2}$ at subframe index n. In FIG. 7(c), curve 86a corresponds to the UE being scheduled in the best beam and curve 88a corresponds to the UE scheduled in the two best beams. In FIG. 7(d), curve 86b corresponds to the UE being scheduled in the best beam and curve 88b corresponds to the UE scheduled in the two best beams. Note that the success rates of the PFS fluctuate initially, and they eventually stabilize for UE distance of 750 m as well as 1000 m. Observe that after about 80 subframes, the success rates stabilize around $\rho_1 = 58.9\%$, $\rho_{1,2} = 86.7\%$ for UEs located at 750 m from the antenna panel (FIG. 7(c)), and $\rho_1 = 44\%$, $\rho_{1,2} = 78.9\%$ for UEs located 1000 m from the antenna panel (FIG. 7(d)). This shows that the PFS in the BBU, when operating independently of the RU, schedules a majority of the users during times of high SINR provided by the narrow agile beam. This is the key reason behind the throughput gains observed in FIG. 7 and Table III.

An example of an analog phased array system that can be used to implement the approach described above is shown in FIGS. 8-11.

Figure 8:
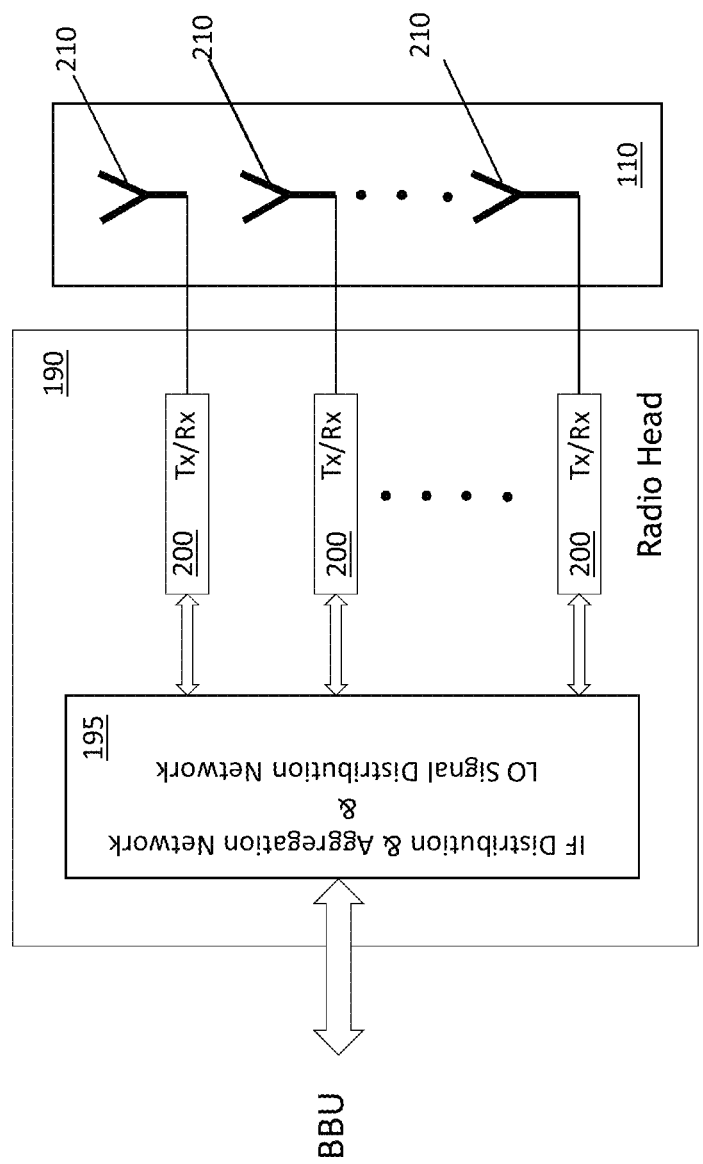
FIG. 8 is an exemplary high-level block diagram showing the internal structure of an exemplary radio head and phased array antenna.

Referring to FIG. 8, the antenna array 110 includes a two-dimensional array of M antenna elements. The radio head 190 includes multiple front-end modules (Tx/Rx modules) 200, equal in number to the number of antenna elements in the array, namely, M. There is a Tx/Rx module 200 for each antenna element. There is also a signal distribution network 195 that includes an IF distribution and aggregation network and an LO signal distribution network. This signal distribution network 195 delivers transmit signals from the BBU to the Tx/Rx modules 200, delivers received signals from the Tx/Rx modules 200 to the BBU, and provides coherent local oscillator signals to the Tx/Rx modules 200 for up-converting IF transmit signals to RF transmit signals and for down-converting RF received signals to IF received signals.

Figure 9:
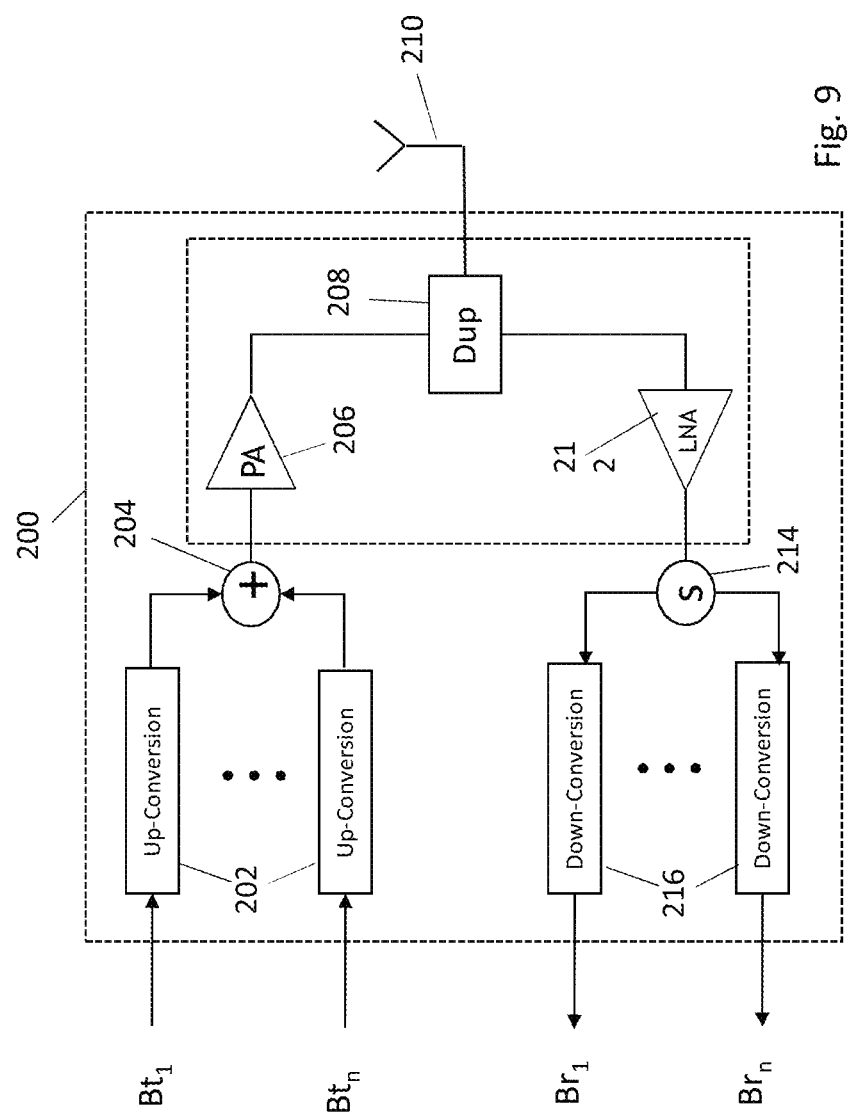
FIG. 9 is an exemplary high-level block diagram of a Tx/Rx module such as is shown in FIG. 8.

FIG. 9 shows a block diagram of the circuitry that connects to a single antenna element 210 of the multi-element antenna array. In the antenna array system having M antenna elements, this circuitry is duplicated for each antenna element. For each antenna element 210, there is a front-end module (or Tx/Rx module) 200 connected to the antenna element 210. The front-end module has a transmitter side and a receiver side. The transmitter side includes N up-conversion modules 202, a combiner circuit 204, and a power amplifier (PA) 206. The receiver side includes a low noise amplifier (LNA) 212, a splitter 214, and N down-conversion modules 216. The N up-conversion modules 202 enable the array to generate N independent transmit beams and the N down-conversion modules 216 enable the array to generate N independent receive beams. The front-end module 200 also includes a duplexer circuit 208 that couples the drive signal from the PA 206 on the transmitter side to the antenna element 210 and couples a received signal from the antenna element 210 to the LNA 212 on the receiver side. The input of each up-conversion module 202 is for receiving a different beam transmit signal stream $Bt_1 \ldots Bt_n$ from the baseband unit (not shown). And the output of each down-conversion module 216 is for outputting a different beam received signal stream $Br_1 \ldots Br_n$. Typically, each beam transmit signal stream is mapped to a different beam that is generated by the active antenna array system and each received signal stream corresponds to the signal received by a different receive beam formed by the active antenna array.

Figure 10:
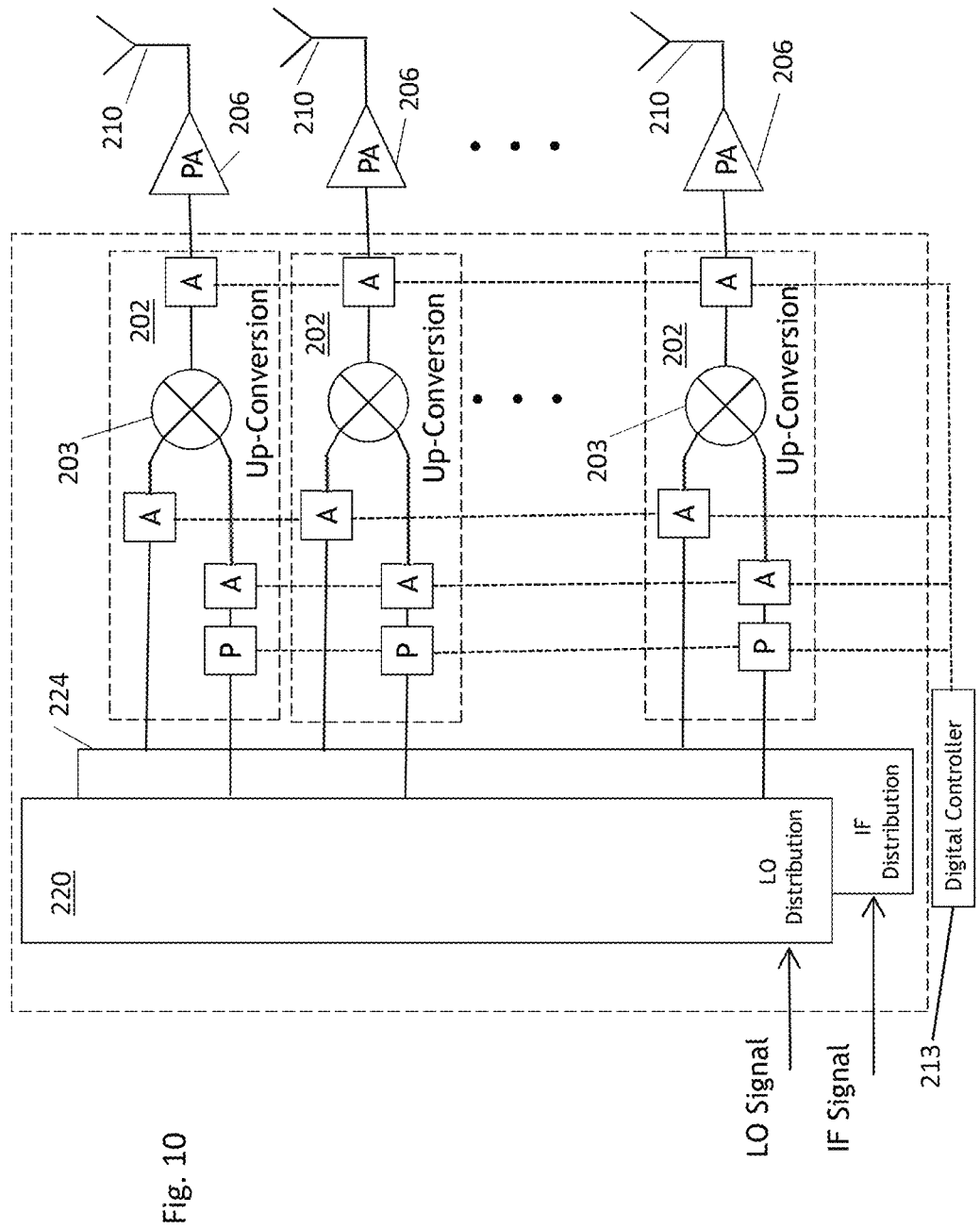
FIG. 10 is an exemplary block diagram of the transmitter side of an active antenna array system showing the circuitry for only one of multiple transmit beams.
Figure 11:
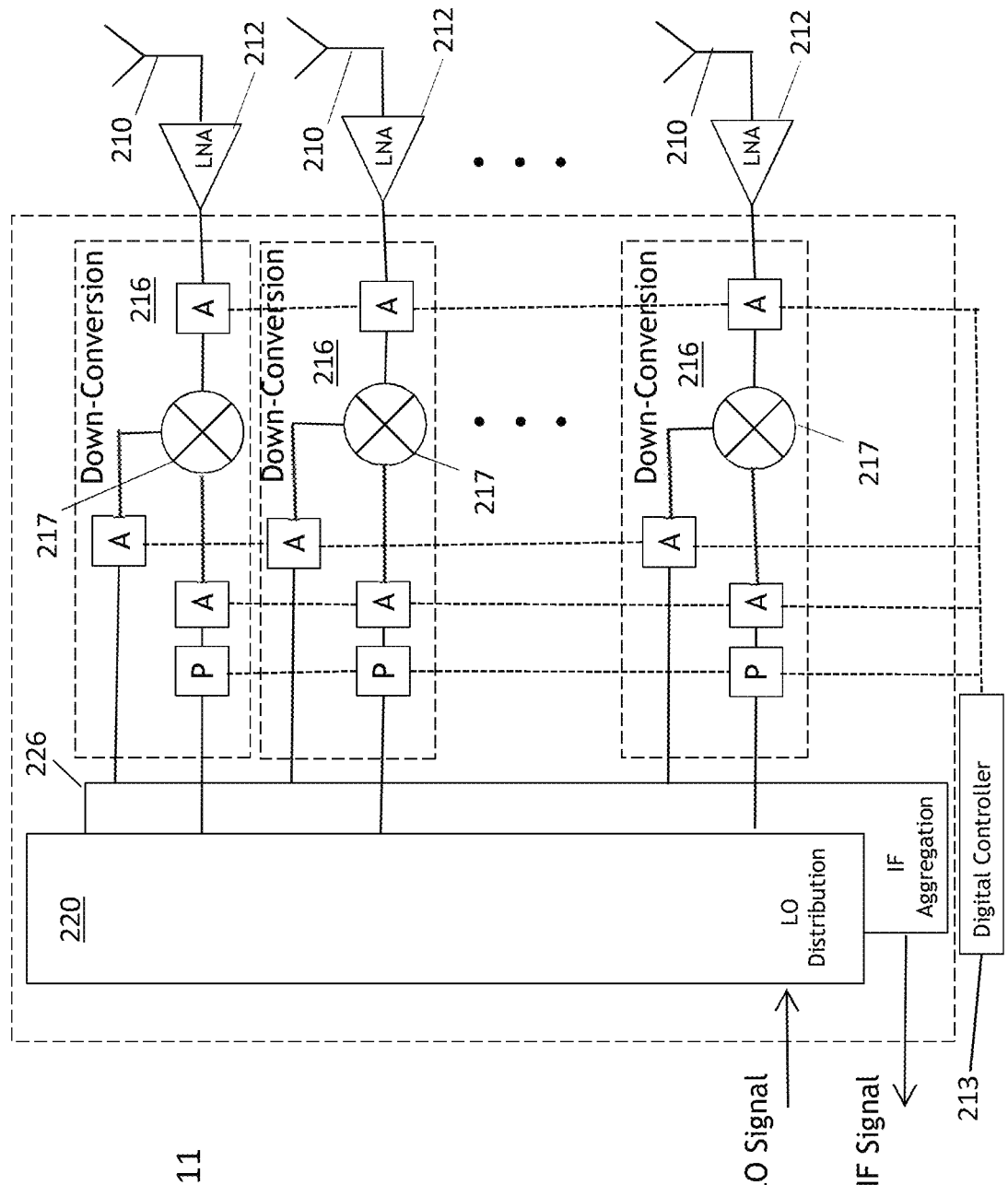
FIG. 11 is an exemplary block diagram of the receiver side of an active antenna array system showing the circuitry for only one of multiple receive beams.

An active antenna array system in which the up-conversion modules 202 are shown in greater detail is depicted in FIG. 10; and an active antenna array system in which the down-conversion modules 216 are shown in greater detail is depicted in FIG. 11. As a practical matter, these two systems, which are shown separately, would be implemented in the same active antenna array system but to simplify the figures, they are presented here separately. The active antenna array system of FIG. 10 is for transmitting one transmit signal stream over a single transmit beam that is generated by the M elements 210 of the antenna array. Because there is only one up-conversion module 202 for each antenna element 210, the combiner 204, which was shown in FIG. 9, is not necessary, so it has been omitted. Similarly, the active antenna array system of FIG. 11 is for receiving a signal stream on a single receive beam pattern that is generated by the antenna array. Again, because there is only one down-conversion module 216 for each antenna element 210, the splitter 214, which was shown in FIG. 9, is not necessary so it has also been omitted.

There is an LO distribution network 220 for distributing a coherent or phase synchronized LO (local oscillator) signal to the M up-conversion modules 202 and the M down-conversion modules 16. As shown in FIG. 8, there is also an IF distribution network 224 for delivering the IF transmit signal to each of the up-conversion modules 202. And as shown in FIG. 11, there is an IF aggregation network 226 for aggregating the received signals from each of the down-conversion modules 216.

The distribution and aggregation networks may be passive linear reciprocal networks with electrically identical paths to ensure the coherent distribution/aggregation of signals. Alternatively, one or more of these networks may be implemented using the bidirectional signaling network described in U.S. Pat. No. 8,259,884, entitled "Method and System for Multi-Point Signal Generation with Phase Synchronized Local Carriers," filed Jul. 21, 2008 and U.S. Pat. No. 8,622,959, entitled "Low Cost, Active Antenna Arrays," filed Jun. 30, 2011 or the serial interconnection approach described in U.S. Pat. No. 9,673,965, entitled "Calibrating a Serial Interconnection," filed Sep. 8, 2016, the contents of all of which are incorporated herein by reference.

In general, each up-conversion module 202 includes a mixer 203 and various amplitude and phase setting circuits identified by A and P, respectively. The LO signal and the distributed IF transmit signal stream are both provided to the mixer 203 which up-converts the IF transmit signal stream to an RF transmit signal stream that is provided to the power amplifier 206. Similarly, each down-conversion module 216 also includes a mixer 217 and various amplitude and phase setting circuits similarly identified by A and P, respectively. The mixer 217 in the down-conversion module 216 multiplies the LO signal provided by the LO distribution network 220 and the received RF signal stream from the low noise amplifier 212 that is coupled to the antenna element 210 to generate a down-converted IF received signal stream. The down-converted IF signal stream is provided to the IF aggregation network 226 for aggregation with the IF received signal streams from the other antenna elements and for transfer back to the base station.

The amplitude and phase setting circuits A and P are used for changing the relative phase or amplitude of individual antenna signals to thereby establish the size, direction, and intensity of the transmit and receive beam patterns that are generated by the antenna array. (Note: In an antenna array, a transmit beam is a radiation pattern that is generated by the antenna array. That radiation pattern can be measured in front of the antenna array. In contrast, a receive beam is not a radiation pattern formed by the antenna array but rather is a pattern of antenna sensitivity. Nevertheless, in spite of this difference, they are both generally referred to as beams.) The amplitude setting circuit is basically equivalent to a variable gain amplifier in which the ratio of the output signal amplitude to the input signal amplitude is programmable and is set by electronic control. The phase setting circuit has the fundamental capability of shifting the input signal in phase (or time) under electronic control. These amplitude and phase setting circuits are controlled by digital control signals supplied by a separate control processor 213.

The typology of the amplitude setting and phase setting circuits shown in FIGS. 10 and 11 is just one of many possibilities for giving the basic transmitter and receiver the capability to control independently the amplitude and phase values of the individual antenna signals. The number and placement of the amplitude and phase setting circuits can vary from what is illustrated in FIGS. 10 and 11. In addition, there are other components which might be present in the up-conversion and down-conversion modules but which are not shown in the figures because they are well known to persons skilled in the art. These might include, for example, channel IF filters and automatic gain controls.

Other embodiments are within the following claims. For example, though the described embodiments involved scanning in one dimension, the concepts described herein can be applied to scanning in two dimensions, e.g. both of the horizontal and vertical dimensions. In addition, though sequential scanning was described; the beams can be activated in any order so long as the entire sector is scanned. Moreover, though principles were applied to the transmit side of the communication link from the RU, they can also be applied to the receive side and scanning of receive beams.

REFERENCES

Ref 1—Y. Kim, H. Ji, H. Lee, J. Lee, B. L. Ng, and J. Zhang, "Evolution beyond LTE-advanced with Full Dimension MIMO," in 2013 *IEEE International Conference on Communications Workshops (ICC)*, June 2013, pp. 111-115.

Ref 2—H. Ji, Y. Kim, Y. Kwak, and J. Lee, "Effect of 3-Dimensional Beamforming on Full Dimension MIMO in LTE-Advanced," in 2014 *IEEE Globecom Workshops (GC Wkshps)*, December 2014, pp. 821-826.

Ref 3—F. W. Vook, T. A. Thomas, and E. Visotsky, "Elevation beamforming with beamspace methods for LTE," in 2013 *IEEE 24th Annual International Symposium on Personal, Indoor, and Mobile Radio Communications (PIMRC)*, September 2013, pp. 554-558.

Ref 4—D. Ying, F. W. Vook, T. A. Thomas, and D. J. Love, "Sub-sector-based codebook feedback for massive MIMO with 2D antenna arrays," in 2014 *IEEE Global Communications Conference*, December 2014, pp. 3702-3707.

Ref 5—G. Xu, Y. Li, J. Yuan, R. Monroe, S. Rajagopal, S. Ramakrishna, Y. H. Nam, J. Y. Seol, J. Kim, M. M. U. Gul, A. Aziz, and J. Zhang, "Full Dimension MIMO (FD-MIMO): Demonstrating Commercial Feasibility," *IEEE Journal on Selected Areas in Communications*, vol. 35, no. 8, pp. 1876-1886, August 2017.

What is claimed is:

1. A method of communicating with a plurality of devices (UEs) that are located within a serviced area, said method comprising:
    defining a set of differently directed, narrow beams which collectively cover the serviced area, wherein each beam covers a different subset of the plurality of UEs within the serviced area;
    receiving a signal from a baseband unit (BBU), said signal having a subframe structure;
    (a) during a first period of operation having a first duration:
        (i) cycling through all of the beams of the set of differently directed beams one at a time by separately activating each beam in synchronization with the subframe structure of the signal from the BBU; and
        (ii) while each beam is activated, initiating channel sounding for all of the UEs among the plurality of UEs in the serviced area;
    (b) during a second period of operation immediately following the first period of operation and having a second duration equal to the first duration:
        (i) cycling through all of the beams of the set of differently directed beams one at a time by separately activating each beam in synchronization with the subframe structure of the signal from the BBU; and
        (ii) while each beam is activated, transmitting data over that beam to the plurality of UEs in accordance with a scheduling scheme that is based on information obtained for that directed beam during the channel sounding initiated during the first period of operation.

2. The method of claim 1, wherein during the first period of operation, each beam is activated for a time equal to $T_b$, wherein $T_b$ is a duration of time.

3. The method of claim 2, wherein $T_b$ is equal to n subframes of the signal from the BBU, wherein n is an integer.

4. The method of claim 3, wherein n=2.

5. The method of claim 2, wherein the first period of operation has a duration of $N_b \times T_b$, where $N_b$ is a positive integer equal to the number of beams in the set of beams.

6. The method of claim 2, wherein during the second period of operation, each beam is activated for a time equal to $T_b$.

7. The method of claim 1, wherein the scheduling scheme is a proportional fair scheduling (PFS) scheme.

8. The method of claim 1, wherein initiating channel sounding for each activated beam during the first period of operation involves sending cell-specific reference signal downlink pilots to all of the UEs among the plurality of UEs.

9. The method of claim 1, further comprising:
    (c) during a third period of operation following the second period of operation:
        (i) separately, in succession, and in synchronization with the subframe structure of the signal from the BBU, activating each beam of a plurality of beams from among the set of beams; and
        (ii) for each beam that is activated during the third period of operation, sending data to only the UE's among the plurality of UEs that are covered by that activated beam.

10. The method of claim 9, wherein the third period of operation immediately follows the second period of operation.

11. The method of claim 9, wherein during the third period of operation, each beam is activated for a time equal to $s_i \times T_b$, wherein $T_b$ is a duration of time, $s_i$ is an integer, and i is an integer index identifying a corresponding beam among the plurality of beams.

12. The method of claim 11, wherein $s_i$ is determined by the number of UEs covered by the corresponding beam.

13. The method of claim 9, wherein the plurality of beams is fewer in number than the number of beams within the set of beams.

14. The method of claim 9, wherein each beam among the plurality of beams that is activated during the third period of operation, is activated for a period equal to a corresponding, integer number of subframes.

15. The method of claim 9, wherein the plurality of beams is selected from among the set of beams based on the number of UE's serviced by each of the beams among the set of beams.

16. The method of claim 9, wherein the duration of the second period of operation and the duration the third period of operation are equal.

17. The method of claim 9, wherein for each beam that is activated during the third period of operation, sending data to only the UE's among the plurality of UEs that are covered by that activated beam is done in accordance with a proportional fair scheduling (PFS) scheme.

18. The method of claim 11, wherein $T_b$ is equal to n subframes of the signal from the BBU, wherein n is an integer.

19. The method of claim 18, wherein n=2.

20. The method of claim 1, wherein cycling during the first period of operation is characterized by a first order of beam activation and cycling during the second period of operation is characterized by a second order of beam activation that is the same as the first order of beam activation.

21. The method of claim 20, wherein cycling through all of the beams during the second period of operation begins immediately after completing cycling through all of the beams during the first period of operation.

22. A method of communicating with a plurality of devices (UEs) that are located within a serviced area, said method comprising:
- defining a set of differently directed, narrow beams which collectively cover the serviced area, wherein each beam covers a different subset of the plurality of UEs within the serviced area;
- receiving a signal from a baseband unit (BBU), said signal having a subframe structure;
- (a) during a first period of operation having a first duration:
  - (i) cycling through all of the beams of the set of differently directed beams one at a time by separately activating each beam in synchronization with the subframe structure of the signal from the BBU; and
  - (ii) while each beam is activated, transmitting data over that beam to the plurality of UEs in accordance with a scheduling scheme that takes into account channel conditions for the plurality of UEs and also acquiring information about the plurality of UEs;
- (b) during a second period of operation following the first period of operation and having a second duration equal to the first duration:
  - (i) separately, in succession, and in synchronization with the subframe structure of the signal from the BBU, activating each beam of a plurality of beams from among the set of beams; and
  - (ii) for each beam that is activated during the second period of operation, sending data to only the UE's among the plurality of UEs that are covered by that activated beam as determined by the information acquired about the plurality of UEs for each beam of the set of beams during the first period of operation.

23. The method of claim 22, wherein during the first period of operation, each beam is activated for a time equal to $T_b$, wherein $T_b$ is a duration of time.

24. The method of claim 23, wherein $T_b$ is equal to n subframes of the signal from the BBU, wherein n is an integer.

25. The method of claim 24, wherein n=2.

26. The method of claim 22, wherein the scheduling scheme is a proportional fair scheduling (PFS) scheme.

27. The method of claim 22, wherein the second period of operation immediately follows the first period of operation.

28. The method of claim 22, wherein during the second period of operation, each beam is activated for a time equal to $s_i \times T_b$, wherein $T_b$ is a duration of time, $s_i$ is an integer, and i is an integer index identifying a corresponding beam among the plurality of beams.

29. The method of claim 28, wherein $s_i$ is determined by the number of UEs covered by the corresponding beam.

30. The method of claim 22, wherein the plurality of beams is fewer in number than the number of beams within the set of beams.

31. The method of claim 22, wherein each beam among the plurality of beams that is activated during the second period of operation, is activated for a period equal to a corresponding, integer number of subframes.

32. The method of claim 22, wherein the plurality of beams is selected from among the set of beams based on the number of UE's serviced by each of the beams among the set of beams.

33. The method of claim 22, wherein the duration of the second period of operation is $N_b \times m \times T_{sub}$, wherein $N_b$ is a positive integer equal to the number of beams in the set of beams, m is a positive integer, and $T_{sub}$ is a duration of a subframe within the signal from the BBU.

* * * * *